(12) United States Patent
Guy et al.

(10) Patent No.: US 12,038,233 B2
(45) Date of Patent: Jul. 16, 2024

(54) HYBRID HEAT EXCHANGER

(71) Applicant: Baltimore Aircoil Company, Inc., Jessup, MD (US)

(72) Inventors: Eric Guy, Laurel, MD (US); Yohann Lilian Rousselet, Boston, MA (US); Kevin Ellsworth Egolf, Hampstead, MD (US)

(73) Assignee: Baltimore Aircoil Company, Inc., Jessup, MD (US)

( * ) Notice: Subject to any disclaimer, the term of this patent is extended or adjusted under 35 U.S.C. 154(b) by 132 days.

(21) Appl. No.: 17/558,203

(22) Filed: Dec. 21, 2021

(65) Prior Publication Data

US 2022/0196330 A1 Jun. 23, 2022

Related U.S. Application Data

(60) Provisional application No. 63/129,796, filed on Dec. 23, 2020.

(51) Int. Cl.
*F28D 1/053* (2006.01)
*F28F 1/02* (2006.01)
(Continued)

(52) U.S. Cl.
CPC .......... *F28D 1/05383* (2013.01); *F28F 1/022* (2013.01); *F28F 1/126* (2013.01); *F28F 1/30* (2013.01); *F28F 2265/32* (2013.01)

(58) Field of Classification Search
CPC ....... F28D 1/05383; F28F 1/022; F28F 1/126; F28F 1/30; F28F 2265/32
See application file for complete search history.

(56) References Cited

U.S. PATENT DOCUMENTS

| 1,844,850 A | 2/1932 | Harmon |
| 3,012,416 A | 12/1961 | Dart |

(Continued)

FOREIGN PATENT DOCUMENTS

| CN | 2322117 Y | 6/1999 |
| CN | 101013006 A | 8/2007 |

(Continued)

OTHER PUBLICATIONS

International Search Report and Written Opinion from related International Application No. PCT/US2021/064878 dated May 6, 2022; 20 pages.

(Continued)

*Primary Examiner* — Raheena R Malik
(74) *Attorney, Agent, or Firm* — Fitch, Even, Tabin & Flannery LLP

(57) ABSTRACT

In one aspect, a hybrid heat exchanger that includes a metallic serpentine tube having an inlet end portion to receive a process fluid, an outlet end portion, and a series of runs and return bends directing the process fluid from the inlet end portion to the outlet end portion of the metallic serpentine tube. The hybrid heat exchanger further includes a thermally conductive polymer body thermally integrated with the serpentine tube. The thermally conductive polymer body has an outer surface to be contacted by a fluid, such as air and/or water. The thermally conductive polymer body is configured to transfer heat between the metallic serpentine tube and the fluid contacting the outer surface of the thermally conductive polymer body. The outer surface of the thermally conductive polymer body includes surface enhancement features that affect flow of the fluid across the outer surface of the thermally conductive polymer body.

43 Claims, 19 Drawing Sheets

(51) Int. Cl.
*F28F 1/12* (2006.01)
*F28F 1/30* (2006.01)

(56) References Cited

U.S. PATENT DOCUMENTS

| | | | |
|---|---|---|---|
| 3,169,575 | A | 2/1965 | Engalitcheff, Jr. |
| 3,346,043 | A | 10/1967 | Thurnauer |
| 4,196,157 | A | 4/1980 | Schinner |
| 4,366,106 | A | 12/1982 | Benyak |
| 4,434,112 | A | 2/1984 | Pollock |
| 4,483,392 | A | 11/1984 | Korsmo |
| 4,518,544 | A | 5/1985 | Carter |
| 4,683,101 | A | 7/1987 | Cates |
| 4,691,769 | A | 9/1987 | Flamm |
| 4,699,211 | A | 10/1987 | Geary |
| 5,228,505 | A | 7/1993 | Dempsey |
| 5,435,382 | A | 7/1995 | Carter |
| 5,596,877 | A | 1/1997 | Morrison |
| 5,724,828 | A | 3/1998 | Korenic |
| 5,816,318 | A | 10/1998 | Carter |
| 6,138,746 | A | 10/2000 | Livolsi |
| 6,216,486 | B1 | 4/2001 | Aaron |
| 6,237,900 | B1 | 5/2001 | Drew |
| 6,247,522 | B1 | 6/2001 | Kaplan |
| 6,260,830 | B1 | 7/2001 | Harrison |
| 6,298,676 | B1 | 10/2001 | Osborne |
| 6,415,615 | B1 | 7/2002 | Osborne |
| 6,564,864 | B2 | 5/2003 | Carter |
| 6,574,980 | B1 | 6/2003 | Morrison |
| 6,598,862 | B2 | 7/2003 | Merrill |
| 6,702,004 | B2 | 3/2004 | Stratman |
| 6,820,685 | B1 | 11/2004 | Carter |
| 6,883,595 | B2 * | 4/2005 | Stratman .............. F28D 5/02 165/115 |
| 7,484,718 | B2 | 2/2009 | Facius |
| 7,603,774 | B2 | 10/2009 | Facius |
| 7,779,898 | B2 | 8/2010 | Morrison |
| 7,810,552 | B2 | 10/2010 | Slaughter |
| 7,815,173 | B2 | 10/2010 | Lin |
| 7,887,030 | B2 | 2/2011 | Hentschel |
| 8,434,746 | B2 | 5/2013 | Carter |
| 9,004,463 | B2 | 4/2015 | Carter |
| 9,057,563 | B2 | 6/2015 | Carter |
| 9,057,564 | B2 | 6/2015 | Carter |
| 9,243,847 | B2 | 1/2016 | Benz |
| 9,255,739 | B2 | 2/2016 | Aaron |
| 9,279,619 | B2 | 3/2016 | Aaron |
| 9,587,885 | B2 | 3/2017 | Aaron |
| 9,803,929 | B2 | 10/2017 | Aaron |
| 9,995,533 | B2 | 6/2018 | Aaron |
| 10,288,351 | B2 | 5/2019 | Aaron |
| 10,443,942 | B2 | 10/2019 | Aaron |
| 10,571,197 | B2 | 2/2020 | Beaver |
| 10,641,554 | B2 | 5/2020 | Beaver |
| 10,655,918 | B2 * | 5/2020 | Beaver ................ F28D 7/0066 |
| 10,677,538 | B2 | 6/2020 | Shin |
| D889,420 | S | 7/2020 | Shin |
| 10,780,632 | B2 | 9/2020 | Vadder |
| 10,843,267 | B2 | 11/2020 | Davidson |
| 2001/0002620 | A1 | 6/2001 | Carter |
| 2007/0101746 | A1 | 5/2007 | Schlom |
| 2007/0187851 | A1 | 8/2007 | Facius |
| 2007/0240445 | A1 | 10/2007 | Morrison |
| 2007/0241468 | A1 | 10/2007 | Kammerzell |
| 2011/0030920 | A1 | 2/2011 | Qin |
| 2011/0120693 | A1 | 5/2011 | Kammerzell |
| 2011/0126564 | A1 | 6/2011 | Anandhakrishnan |
| 2012/0001352 | A1 | 1/2012 | Carter |
| 2014/0166254 | A1 | 6/2014 | Carter |
| 2014/0264973 | A1 | 9/2014 | Aaron |
| 2016/0138869 | A1 | 5/2016 | Aaron |
| 2017/0284742 | A1 | 10/2017 | Aaron |
| 2018/0328673 | A1 | 11/2018 | Stoia |
| 2019/0134894 | A1 | 5/2019 | Vadder |
| 2020/0256621 | A1 | 8/2020 | Beaver |
| 2021/0107217 | A1 | 4/2021 | Vadder |

FOREIGN PATENT DOCUMENTS

| | | |
|---|---|---|
| CN | 102057243 A | 5/2011 |
| CN | 102313483 A | 1/2012 |
| CN | 108317775 A | 7/2018 |
| EP | 2873941 A1 | 5/2015 |
| GB | 1170636 A | 11/1969 |
| GB | 1382685 A | 2/1975 |
| GB | 2129110 A | 5/1984 |
| JP | S59158874 U | 10/1984 |
| JP | S60128169 U | 8/1985 |
| JP | S6423091 A | 1/1989 |
| JP | H01111958 U | 7/1989 |
| JP | H0719764 A | 1/1995 |
| JP | H07280464 A | 10/1995 |
| WO | 2009129517 A1 | 10/2009 |
| WO | 2019006168 A1 | 1/2019 |

OTHER PUBLICATIONS

EVAPCO, Inc.; Eco-Coolers; 2010; 23 pages.
Invitation to Pay Additional Fees from related International Application No. PCT/US2021/064878 dated Feb. 25, 2022; 2 pages.
Langnau, Leslie; Metal additive manufacturing enables lean, green heat exchanger; article from https://www.makepartsfast.com/metal-additive-manufacturing-enables-lean-green-heat-exchanger/; Mar. 17, 2016; 13 pages.
Mesan USA, MXC Series Closed Circuit Cross Flow Inducted Draft; 2012; 6 pages.

* cited by examiner

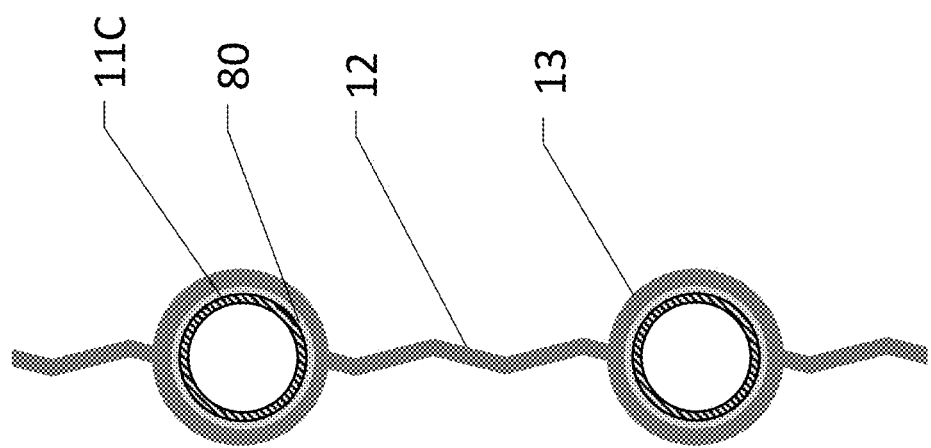
FIG. 4

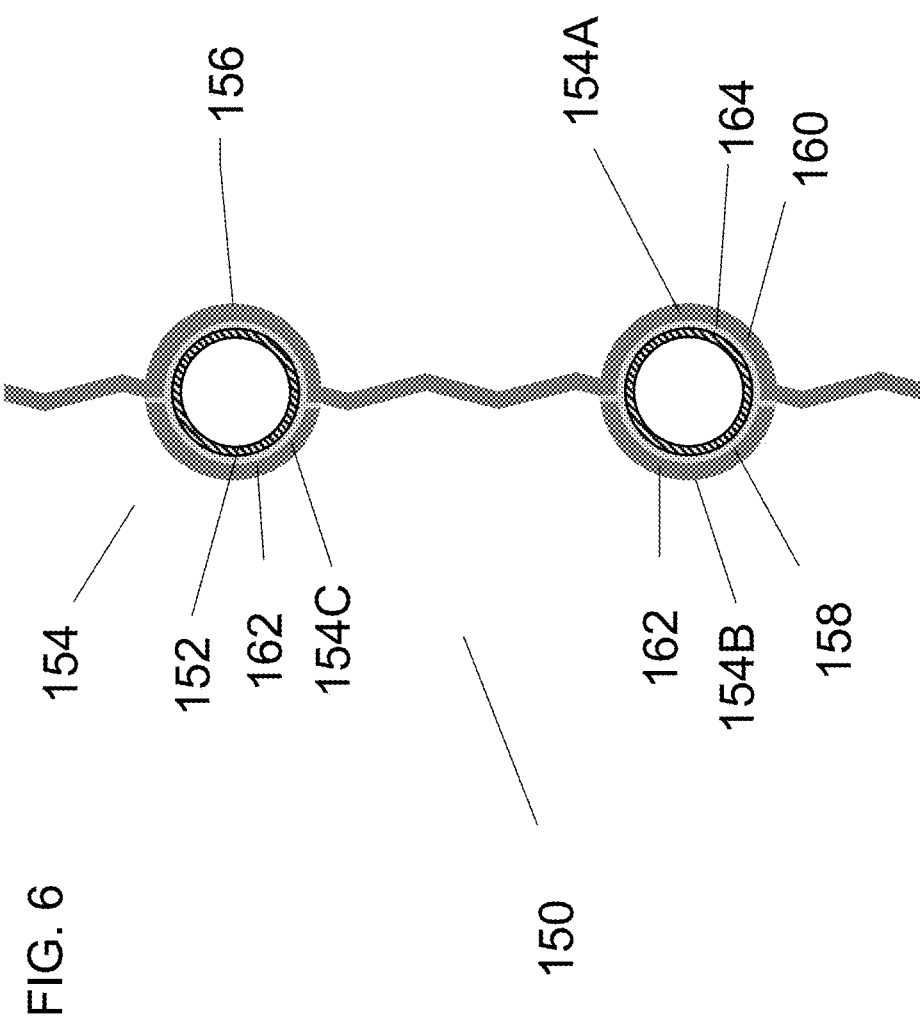

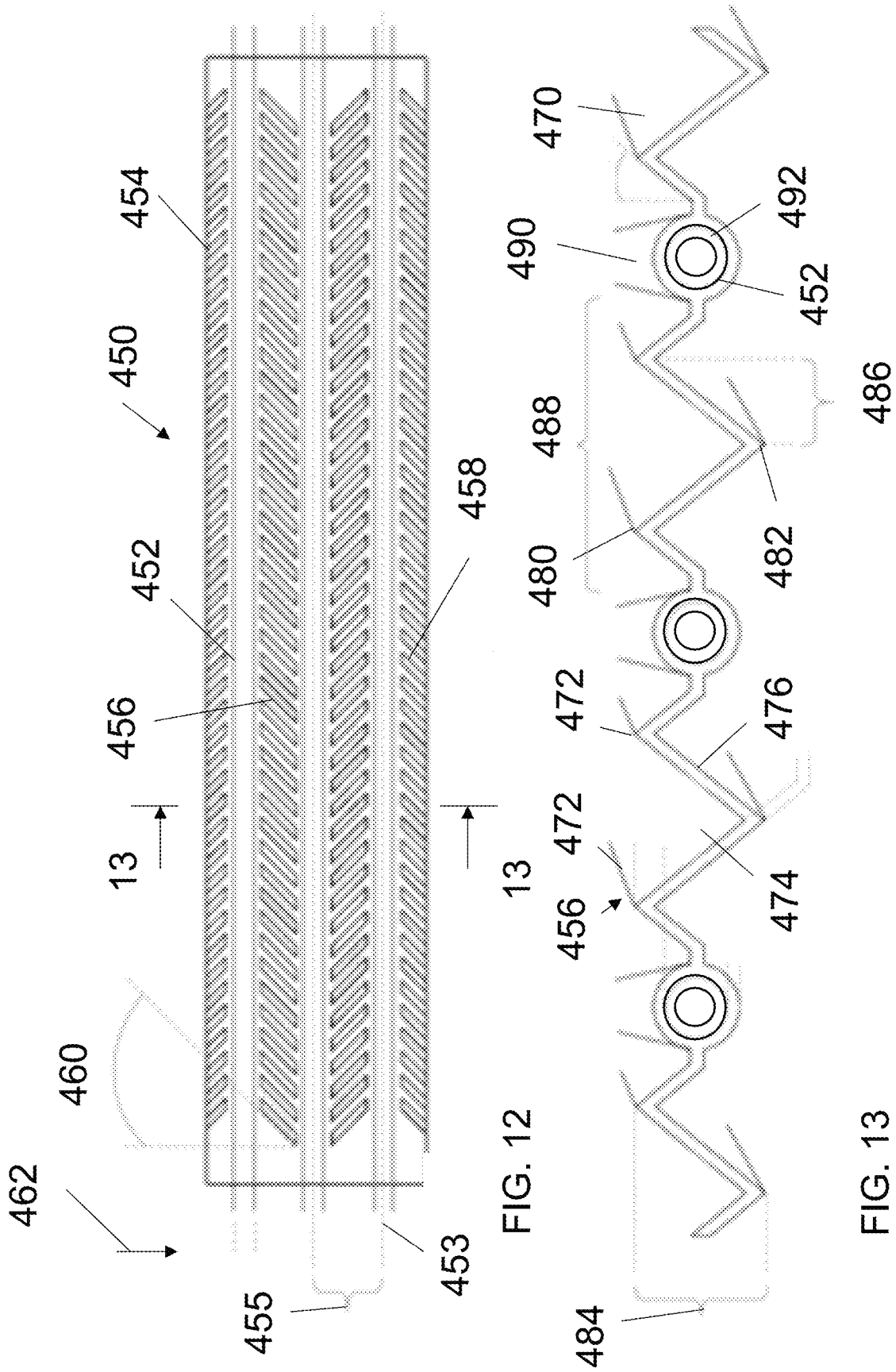

HYBRID HEAT EXCHANGER

CROSS-REFERENCE TO RELATED APPLICATION

This application claims the benefit of U.S. Provisional Patent App. No. 63/129,796, filed Dec. 23, 2020.

FIELD

This disclosure relates to heat exchangers and, more specifically, to indirect heat exchangers.

BACKGROUND

Various types of indirect heat exchangers are known. Plate-and-frame heat exchangers, pillow plate heat exchangers, and plate-coil heat exchangers, all utilize formed metal plates that are typically either welded together then hydraulically expanded or pressed together with gaskets to form a fluid tight cassette. These indirect heat exchangers are collectively referred to as plate heat exchangers. Similarly, serpentine coil indirect heat exchangers are often used.

Direct heat exchangers are also known, such as thermoformed polyvinyl chloride (PVC) fill, which may be used in combination with indirect heat exchangers. For example, fill may be positioned above or below serpentine coils to provide an area for evaporative fluid to interact with air before or after the evaporative fluid contacts the serpentine coils.

Plate heat exchangers may be relatively expensive and difficult to produce, in some cases driving the cost-per-ton of cooling above what the market will bear. Serpentine coil heat exchangers, on the other hand, may be less expensive, but are not able to match the surface area density, and thus the heat exchange efficiency, of plate heat exchangers. Stainless steel (SST) plate heat exchangers are more expensive, typically up to three or four times more, and at the same time are less conductive than their hot-dip galvanized black steel (HDG) equivalent yet SST plate heat exchangers are often specified for the purpose of enabling higher corrosion resistance.

Thermally conductive polymers have been used in low pressure heat exchangers and may be more desirable from a material cost perspective than metal materials. However, these heat exchangers are insufficiently strong to resist internal pressures required for certification in many fields, such as refrigerant coils. For example, some applications of plate heat exchangers require the plate heat exchangers to withstand 150 psig or more, such as 300 psig or even 1000 psig. Making a plate heat exchanger out of thermally conductive polymer for these high-pressure applications is therefore impractical using known thermally conductive polymers.

BRIEF DESCRIPTION OF THE DRAWINGS

FIG. 4 is a cross-sectional view taken across line 4-4 in FIG. 1 showing sheath portions of the body that receive runs of the serpentine tube;

FIG. 6 is a cross-sectional view of a hybrid heat exchanger having a thermally conductive polymer body that includes a sheet and cover portions connected about fluid conduits;

FIG. 12 is a view of a portion of a hybrid heat exchanger having fluid conduits and a thermally conductive polymer body, FIG. 12 showing chevrons of an outer surface of the body;

FIG. 13 is a cross-sectional view taken across line 13-13 in FIG. 12 showing ridges and grooves of the chevrons of the body;

DETAILED DESCRIPTION

Figure 1:
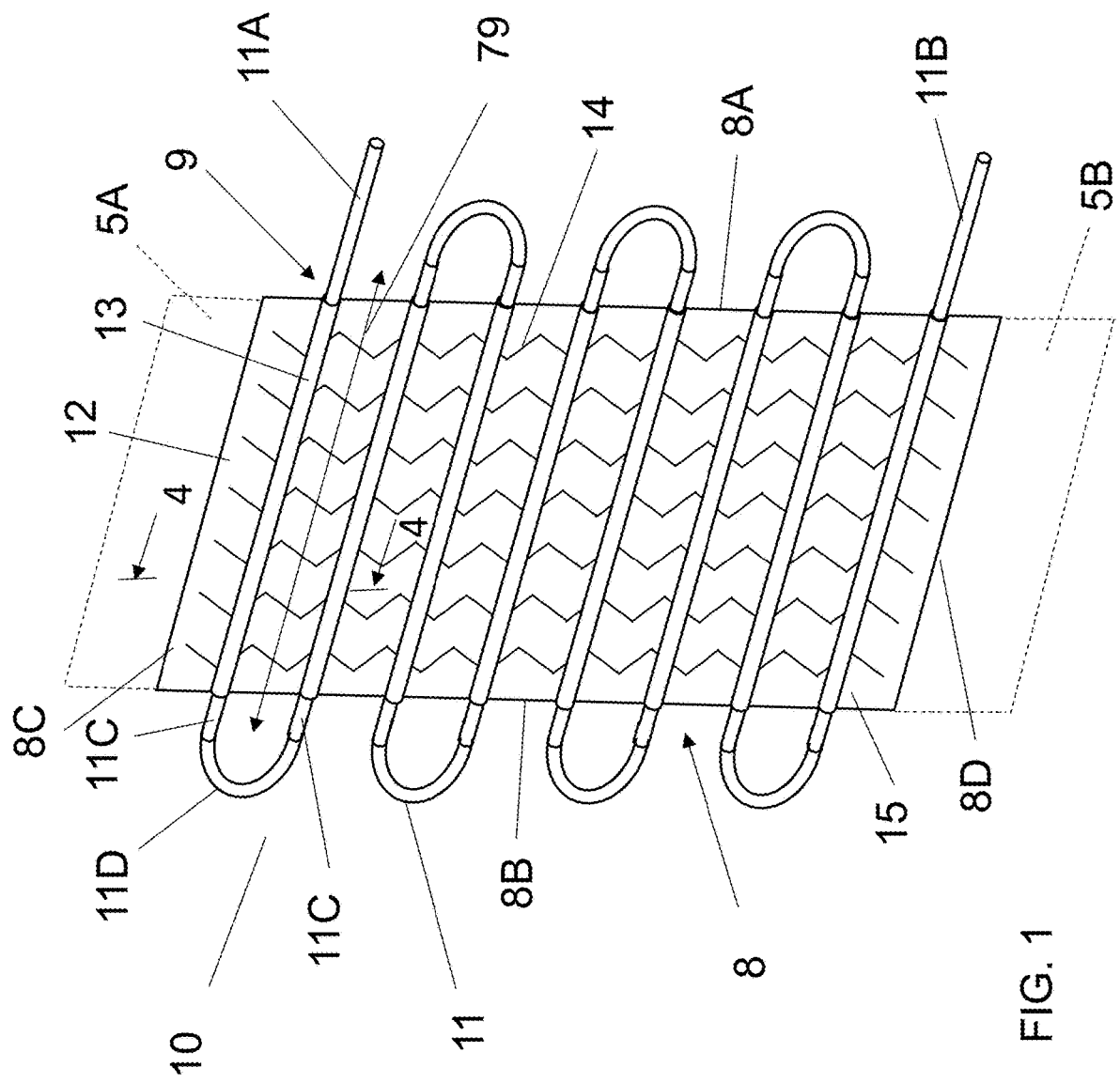
FIG. 1 is a perspective view of a hybrid heat exchanger having a metallic serpentine tube and a body of thermally conductive polymer thermally integrated therewith.

In accordance with one aspect of the present disclosure, a hybrid heat exchanger is provided that includes a metallic serpentine tube having an inlet end portion to receive a process fluid, an outlet end portion, and a series of runs and return bends directing the process fluid from the inlet end portion to the outlet end portion of the metallic serpentine tube. The hybrid heat exchanger further includes a thermally conductive polymer body thermally integrated with the serpentine tube. The thermally conductive polymer body has an outer surface to be contacted by a fluid, such as air and/or an evaporative liquid such as water. The thermally conductive polymer body is configured to transfer heat between the metallic serpentine tube and the fluid contacting the outer surface of the thermally conductive polymer body. The outer surface of the thermally conductive polymer body includes surface enhancement features that affect fluid flow across the outer surface of the thermally conductive polymer body.

The hybrid heat exchanger having the metallic tube and thermally integrated thermally conductive polymer body combines the strength of the metallic tube, which can withstand high process fluid operating pressures with the readily manufactured thermally conductive polymer body. The high process fluid operating pressures may be at least 150 psig for a process fluid such as water, glycol, and brine, up to 410 psig for refrigerants such as ammonia or HCFC-22, or 1200 psi or greater for refrigerants such as $CO_2$. Further, the surface enhancement features of the outer surface of the thermally conductive polymer body improve the ability of the thermally conductive polymer body to facilitate heat transfer between the process fluid in the metallic serpentine tube and the fluid at the outer surface of the thermally conductive polymer body.

In accordance with another aspect of the present disclosure, a heat exchanger system is provided that includes an inlet header to receive a process fluid, an outlet header, and a plurality of fluid conduits of a first thermally conductive material. The first thermally conductive material may be a metal, such as stainless steel or copper, a non-metallic material such as a ceramic, a composite, or a conductive polymer. The fluid conduits each have an inlet end portion connected to the inlet header, an outlet end portion connected to the outlet header, and an intermediate portion between inlet and outlet end portions along the fluid conduits. The fluid conduits are thereby configured to permit process fluid to flow from the inlet header to the outlet header.

The heat exchanger system includes a body of thermally conductive polymer different than the first thermally conductive material and having an outer surface. The thermally conductive polymer body is in thermal contact with intermediate portions of the fluid conduits and is configured to facilitate heat transfer between the process fluid as the process fluid travels through the intermediate portions of the fluid conduits and a fluid at the outer surface of the thermally conductive polymer body. Because the thermally conductive polymer body is of a different material than the first thermally conductive material of the fluid conduits, the first thermally conductive material may be selected to provide sufficient strength to resist high pressure process fluid whereas the material of the thermally conductive polymer body may be selected without being limited by pressure handling requirements.

The present disclosure also provides a method of forming a hybrid heat exchanger including providing a metallic tube to receive a process fluid and manufacturing a body of a thermally conductive polymer. The body has an outer surface with surface enhancement features to affect fluid flow at the body outer surface. The method further includes thermally integrating the thermally conductive polymer body and the metallic tube. In one embodiment, manufacturing comprises producing the body using additive manufacturing and integrating the thermally conductive polymer body and the metallic tube comprises forming the body using additive manufacturing about the metallic tube. In another approach, manufacturing comprises using additive manufacturing to form the body and integrating the thermally conductive polymer body and the metallic tube includes assembling portions of the body about the metallic tube.

In one aspect of the present disclosure, a method is provided that includes additive manufacturing such as three-dimensional (3D) printing, molding, and/or attaching of a thermally conductive polymer to one or more fluid conduits, such as one or more metal tubes, to create a lower cost yet highly efficient hybrid plate heat exchanger. In some examples, air and water handling features are formed into a polymer sheet of the hybrid plate heat exchanger via molding or 3D printing techniques, which can be used to avoid bypass, to optimize water distribution over the heat exchanger, to promote water/air mixing, and/or to provide a thermally conductive polymer or polymer/metal hybrid surface area to enable heat transfer from the tubes. Thermally conductive polymers have typically ten times higher conductive properties relative to traditional polymers, on par with SST metals, while costing less per unit weight. Thus, thermally conductive polymers permit lower cost materials of construction while maintaining thermal performance.

In general, a thermally conductive polymer refers to polymers that have thermal conductivity of over 2 W/m·K, such as between 2 and 100 W/m·K, such as above 5 W/m·K, such as 10 W/m·K. The table below compares the approximate thermal conductivity for various materials measured at 20° C.

| Material | Typical Thermal Conductivity (W/m · K) |
| --- | --- |
| Aluminum | 240 |
| Copper | 400 |
| 304 Stainless Steel | 15 |
| Carbon Steel | 40 |
| Polymers | 0.1 to 0.6 |
| Thermally conductive polymers | 2 to 100 |

In one embodiment, metallic tubes can be used for process fluid handling to meet pressure requirements for the hybrid heat exchanger. Examples of metals that may be used for the tubes include aluminum, copper, stainless steel, and carbon steel. Alternative materials of construction could also be considered for the tubes, such as ceramics and conductive polymers.

Some described examples involve the combination of dissimilar materials and manufacturing processes (e.g., thermally conductive polymer and metallic tubes) to create a hybrid heat exchanger. At least one hybrid heat exchanger presented herein utilizes a metallic tube structure to contain the internal pressure of high-pressure process fluid, which may be provided at greater than 150 PSIG such as greater than 200 PSIG or greater than 300 PSIG, while the thermally conductive polymer is used to extend the surface area of the hybrid heat exchanger with a lower material cost than typical single material metallic plate heat exchangers.

In one aspect of the present disclosure, a readily manufactured, low-cost plate heat exchanger is provided that may be configured for various applications (different sizes, dimensions, patterns for use in specific unit types) without extensive tooling or equipment changes. The plate heat exchanger addresses pressure handling problems of welded metal plates, where the weld serves as a weak point. The plate heat exchanger is adapted to maintain surface area density of a heat exchanger while improving cost, manufacturability, and adaptability. Using high-conductivity polymer material joined to the tubes containing pressurized process fluid enables excellent heat transfer with high corrosion and fouling resistance at lower cost than SST heat exchangers, and weight reduction.

The utilization of a first material for a process fluid-handling fluid conduit and a second material connected to the fluid conduit permits engineering flexibility (i.e., designs that are adaptable to a particular application and not constrained by traditional manufacturing considerations) and cost-effective heat exchangers while being able to meet pressure handling requirements. There are a variety of different tube circuit and polymer sheet configurations (e.g., surface patterns) that may be utilized with this approach. Additionally, it is also contemplated that it would be possible to print or mold fill as a continuation of the plate to combine both features into one plate heat exchanger. This technology may be applied in any arena requiring heat transfer into or out of a pressurized fluid channel (e.g., automotive/aerospace: battery cooling, engine cooling, power electronics cooling; consumer HVAC, high performance computing cooling).

The examples shown in the figures are meant to be exemplary, and it is contemplated that they could be modified or redesigned, for example, in a way to optimize the design for high volume manufacturing and balance the cost versus thermal performance.

Regarding FIG. 1, a hybrid heat exchanger 10 is provided through which a process fluid, such water, glycol, brine, ammonia, or CO2, passes to be cooled by the hybrid heat exchanger 10. The hybrid heat exchanger 10 includes a fluid conduit, such as a tube 11, and a body 12 of a thermally conductive polymer material. The tube 11 is configured to withstand high internal operating pressures, such as at least 150 psig, exerted on the interior of the tube 11 by the process fluid therein. The body 12 facilitates heat transfer between the high-pressure process fluid traveling through the tube 11 and a fluid, such as air and/or water, contacting an outer surface 15 of the body 12.

The tube 11 has an inlet end portion 11A, an outlet end portion 11B, and an intermediate portion 9 intermediate the inlet and outlet end portions 11A, 11B along the tube 11. In one embodiment, the tube 11 is a serpentine tube and the intermediate portion 9 includes runs, such as straight runs 11C, and return bends 11D. The straight runs 11C are arranged as a vertical array of tube portions. The tube 11 may have a unitary construction and may be formed by, for example, extruding a tube having a desired cross-section to a length. Another approach to forming the tube 11 includes rolling a strip of material into a desired cross-sectional configuration and welding longitudinal edges of the strip together. In yet another embodiment, the tube 11 may be an assembly of components. For example, the straight runs 11C may be made of a first material and the return bends 11D are made of a second material, such as different first and second metals, and the straight runs 11C and returns bends 11D are connected together such as via welding.

The tube 11 has an overall length and a cross-section normal to the length. The cross-section of the tube 11 may be uniform through the length or may vary throughout the length. For example, the straight runs 11C may have a different cross-section than the return bends 11D. The cross-section of the tube 11 may include, for example, a cross-section that is at least one of circular, elliptical, oblong, and obround.

The body 12 has sleeve portions, such as sheaths 13, that receive the straight runs 11C of the tube 11. The body 12 also has an outer surface 15 including surface features 14 such as a three-dimensional surface pattern that guides fluid flowing across the outer surface 15 and/or improves heat transfer between the fluid flowing across the outer surface 15 and the body 12. Examples of the surface features 14 include projections such as chevrons, peaks and valleys, ridges, etc. The surface features 15 may be formed in a variety of different patterns or configurations to control the distribution of fluid throughout the assembly and enhance heat transfer between the process fluid in the tube 11 and a fluid, such as water and/or air, contacting the outer surface 15 of the body 12.

The body 12 may be made of one or more thermally conductive polymer materials which may provide high strength and improved thermal performance compared conventional heat exchanger materials. In one embodiment, the thermally conductive polymer includes an elastomer, such as a plastic, synthetic rubber, or natural rubber. The elastomer is infused with particles of graphite or metal to provide thermal conductivity. In another embodiment, the thermally conductive material includes a polymer and a continuous fiber or wire of metal in the polymer.

The thermally conductive polymer of the body 12 may be a polymer material doped with a metallic material. For example, the thermally conductive polymer of the body 12 may be a thermoplastic polyurethane (TPU) doped with thermally conductive material. As another example, the elastomer of the thermally conductive polymer of the body 12 may include polylactic acid (PLA), acrylonitrile butadiene styrene (ABS), or nylon-based materials. The thermally conductive doping material may include, for example, graphite fibers, aluminum fibers, or copper fibers.

In one embodiment, the body 12 is a shell for the tube 11 and the inlet end portion 11A, outlet end portion 11B, and returns bends 11D are outside of the shell. The body 12 has an outer periphery 8 including vertical edges 8A, 8B and horizontal edges 8C, 8D. It is noted that the terms vertical and horizontal are used to describe relative positioning rather than describing an orientation relative to the earth, for example.

Regarding FIG. 1, the body 12 may have an upper fill portion 5A extending above an uppermost one of the straight runs 11C of the tube 11 and a lower fill portion 5B extending below a lowermost one of the straight runs 11C. The upper and lower fill portions 5A, 5B provide additional surface area for a fluid, such as evaporative liquid, to travel along the body 12 and transfer heat with the body 12. Further, in an embodiment where evaporative liquid such as water is distributed onto the hybrid heat exchanger 10 and airflow is directed along the evaporative heat exchanger 10 counter or transverse to the evaporative liquid, the upper and lower fill portions 5A, 5B provide additional area for latent and sensible heat transfer between the air and the evaporative liquid. The upper and lower fill portions 5A, 5B may include surface enhancement features such as protrusion patterns, chevrons, ridges, grooves, male/female members, etc.

Figure 2:
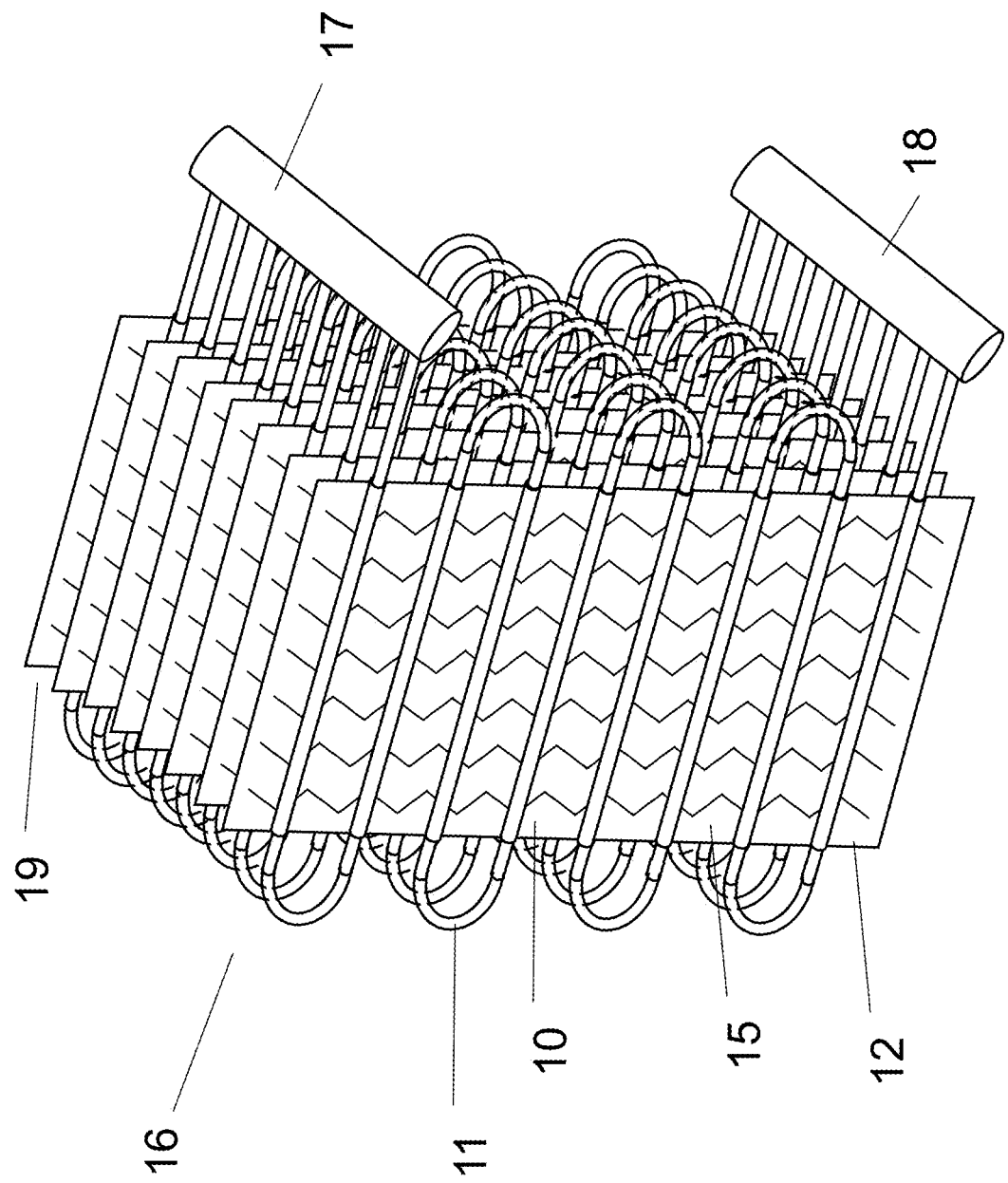
FIG. 2 is a perspective view of a hybrid heat exchanger assembly including multiple hybrid heat exchangers of FIG. 1 connected to inlet and outlet headers.

Regarding FIG. 2, a hybrid heat exchanger assembly 16 is provided having multiple hybrid heat exchangers 10 connected in parallel to an inlet header 17 and an outlet header 18. The tube 11 of each hybrid heat exchanger 10 defines a separate flow path or circuit for process fluid from the inlet header 17 to the outlet header 18. The inlet and outlet headers 17, 18 may be reversed for a given embodiment.

The bodies 12 have spacings 19 therebetween that permit fluid to travel along the outer surfaces 15 of the bodies 12. In one embodiment, each tube 11 has a respective body 12 integrated therewith and there is a spacing between the bodies 12. In another embodiment, a single body 12 may be integrated (e.g., molded, 3D printed, assembled) with two, three, or more tubes 11. The single body 12 may have through openings therein that permit air and evaporative fluid to pass through the hybrid heat exchanger assembly 16. An example single body configuration is discussed in greater detail below with respect to FIG. 10.

Regarding FIG. 2, the number of hybrid heat exchangers 10, as well as the configurations of tubes 11 and bodies 12, can be customized to a particular application. The body 12 of each hybrid heat exchanger 10 is integrated, such as deposited onto the tube 11 using additive manufacturing, molded onto the tube 11, and/or mechanically secured to the tube 11 to form a continuous plate-type heat exchanger that both helps distribute the heat from the process fluid in the tube 11 as well as enhances interaction with a fluid, such as air and/or evaporative cooling water, contacting the outer surfaces 15 of the bodies 12. To this end, the surface features 14 are formed into the body 12 in a manner specific to the application. Additionally, the body 12 may extend above, below, or both above and below the tube 11 to create the fill portions (see 5A, 5B in FIG. 1) for the fluid contacting the outer surface 15 and further enhance the heat transfer characteristics of the hybrid heat exchanger assembly 16.

Figure 3:
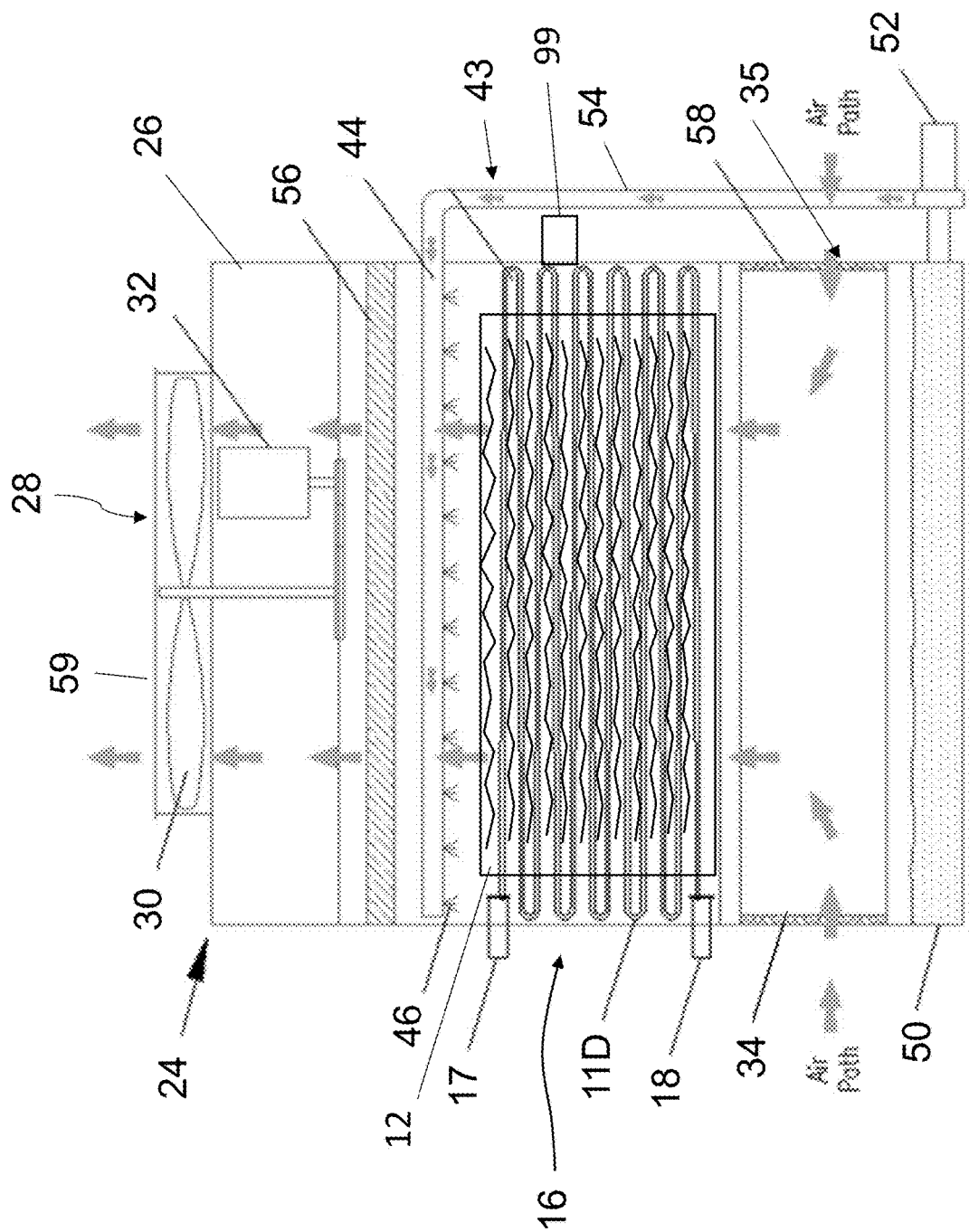
FIG. 3 is a cooling tower including the hybrid heat exchanger assembly of FIG. 2.

Regarding FIG. 3, a heat rejection apparatus, such as a cooling tower 24, is provided that incorporates one or more direct and/or indirect heat exchangers, such as the hybrid heat exchanger assembly 16 and fill 34. The cooling tower 24 has an outer structure 26 and one or more fans 28 including fan blades 30 and motor(s) 32. The cooling tower 24 may be an evaporative condenser, closed circuit cooling tower, or dry cooler heat exchanger as some examples. The fill 34 is shown below the hybrid heat exchanger assembly 16 but, in other embodiments, the fill 34 is above and/or to the side of the hybrid heat exchanger assembly 16.

Regarding FIG. 3, the cooling tower 24 has an evaporative liquid distribution system 43 including a spray assembly 44 having spray nozzles or orifices 46 that distribute an evaporative fluid, such as water, onto the hybrid heat exchanger assembly 16. The evaporative liquid distribution system 43 includes a sump 50 for collecting evaporative fluid from the fill 34 and hybrid heat exchanger assembly 16 and a pump 52 that pumps the collected evaporative fluid through a pipe 54 to the spray assembly 44.

The cooling tower 24 further includes one or more air inlets 35, inlet louvers 58 which keep the evaporative liquid from leaving cooling tower 24, an air outlet 59, and an eliminator 56 to collect water mist from the air before the air leaves the air outlet 59. The fan 28 is operable to generate or induce air flow upwards relative to the hybrid heat exchanger assembly 16 and the fill 34. In other embodiments, the cooling tower 24 may have one or more fans configured to induce airflow in downflow or crossflow directions relative to the indirect heat exchanger and/or direct heat exchanger of the cooling tower 24.

Regarding FIG. 4, a cross-sectional view is provided of a portion of the hybrid heat exchanger 10. The straight runs 11C of the tube 11 are received in the sheath portions 13 of the body 12. The sheath portions 13 extend about the entire cross-section of the straight runs 11C for at least a portion of a length 79 (see FIG. 1) of the runs 11C. In one embodiment, the hybrid heat exchanger 10 has thermally conductive paste 80 intermediate the body 12 and the runs 11C to improve thermal contact between the body 12 and the runs 11C. In other embodiments, the thermally conductive paste 80 is not used. For example, direct printing/molding of the body 12 onto the runs 11C, expanding the runs 11C into engagement with the body 12C (such as by advancing a ball bearing through the tube 11 to increase an outer diameter of the tube 11 or applying pressurized liquid into the tube 11), a mechanical connection such as a snap-fit or a clamping mechanism to secure the body 12 and the tube 11, or bake-to-finish methods for achieving surface contact between the body 12 and the tube 11 may be used. In some instances, the thermally conductive paste 80 may be a bonding agent or adhesive to provide mechanical stability, e.g., a no-slip construct of the tube 11 and the body 12. In one embodiment, the thermally conductive paste 80 may be a coating to protect the tube 11.

Figure 5:
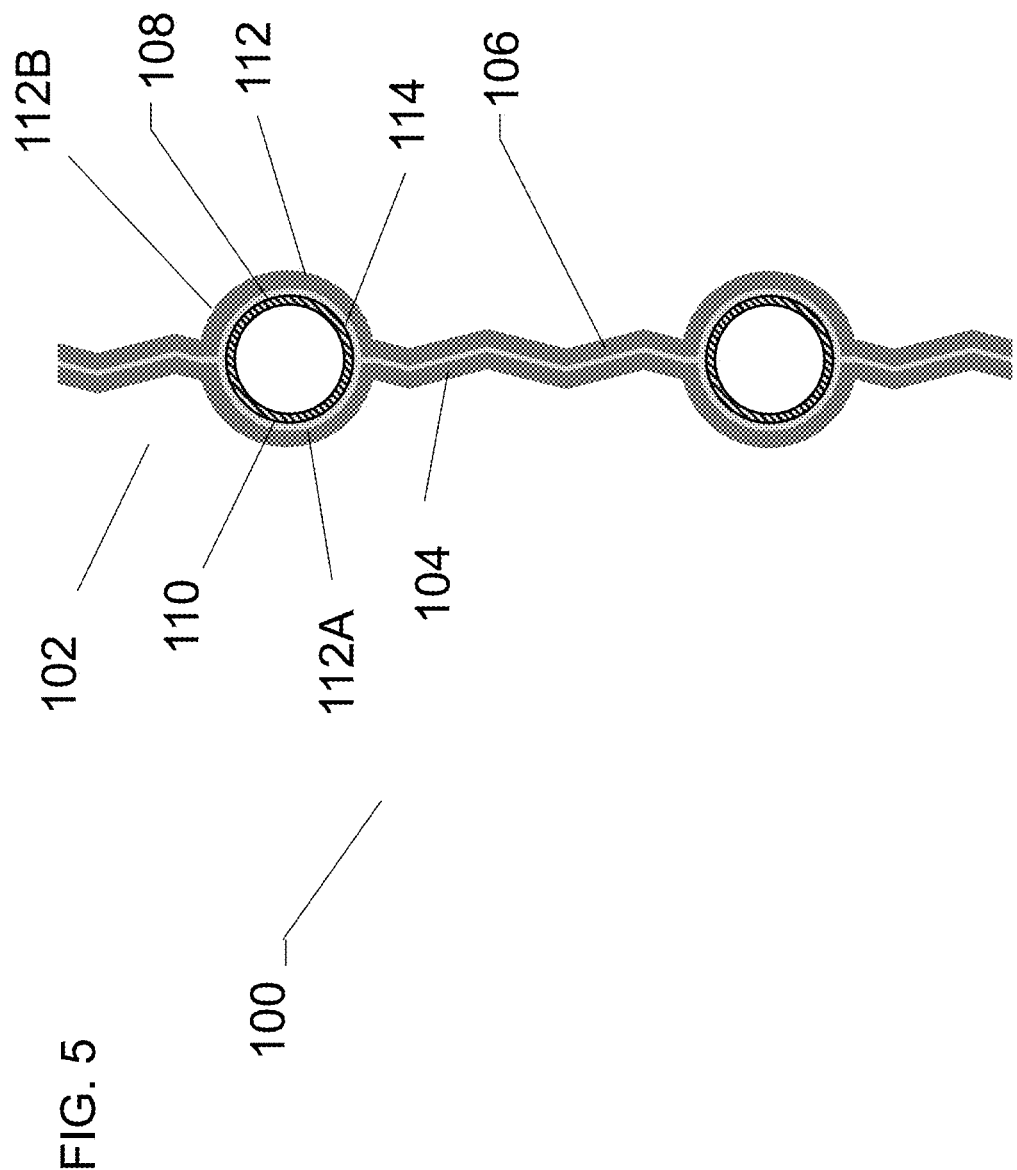
FIG. 5 is a cross-sectional view of another hybrid heat exchanger having a thermally conductive polymer body including two sheets that are joined together using a thermally conductive paste about two fluid conduits.

Regarding FIG. 5, a hybrid heat exchanger 100 is provided that is similar to the hybrid heat exchanger 10 discussed above with respect to FIG. 4. The hybrid heat exchanger 100 has a body 102 of a thermally conductive polymer. The body 102 includes two sheets 104, 106 that are assembled around runs 108 of a tube 110. The sheets 104, 106 may include mating portions, such as snap-fit members, that engage to connect the sheets 104, 106 to the tube 110. The body 102 has a sheath 112 formed by sheath portions 112A, 112B of the sheets 104, 106. The hybrid heat exchanger 100 further includes a thermally conductive paste 114 such as epoxy. The thermally conductive paste 114 may be used to pro promote heat transfer and/or ensure mechanical stability. In one embodiment, the body 102 is heated to adhere the sheets 104, 106 to each other and the tube 110.

Regarding FIG. 6, a hybrid heat exchanger 150 is provided that is similar to the hybrid heat exchanger 10 discussed above with respect to FIG. 4. The hybrid heat exchanger 150 includes a tube 152 and a body 154 of a thermally conductive polymer. The body 154 has a sheet 154A and covers 154B, 154C. The sheet 154A has a different size and shape than the covers 154B, 154C. The sheet 154A and covers 154B, 154C cooperate to form a sheath portion 156 of the body 154. The sheath portion 156 has an opening 158 to receive the tube 152. The sheet 154A and covers 154B, 154C each have a collar portion 160, 162 are configured to compliment an outer surface of the tube 152. In one embodiment, the collar portion 160 of the sheet 154A extends around a majority of the cross-section of the tube 152 and the collar portions 162 of the covers 154B, 154C extend around a minority of the cross-section of the tube 152. In other embodiments, the collar portion 160 may extend about a minority of the cross-section and the collar portion 162 extends about a majority of the cross-section, or the collar portions 160, 162 may have a similar extent about the cross-section. In one embodiment, the hybrid heat exchanger 150 includes a paste 164 in the opening 158 between the body 154 and the tube 11. The paste 164 may be used to promote heat transfer and/or ensure mechanical stability.

Figure 7A:
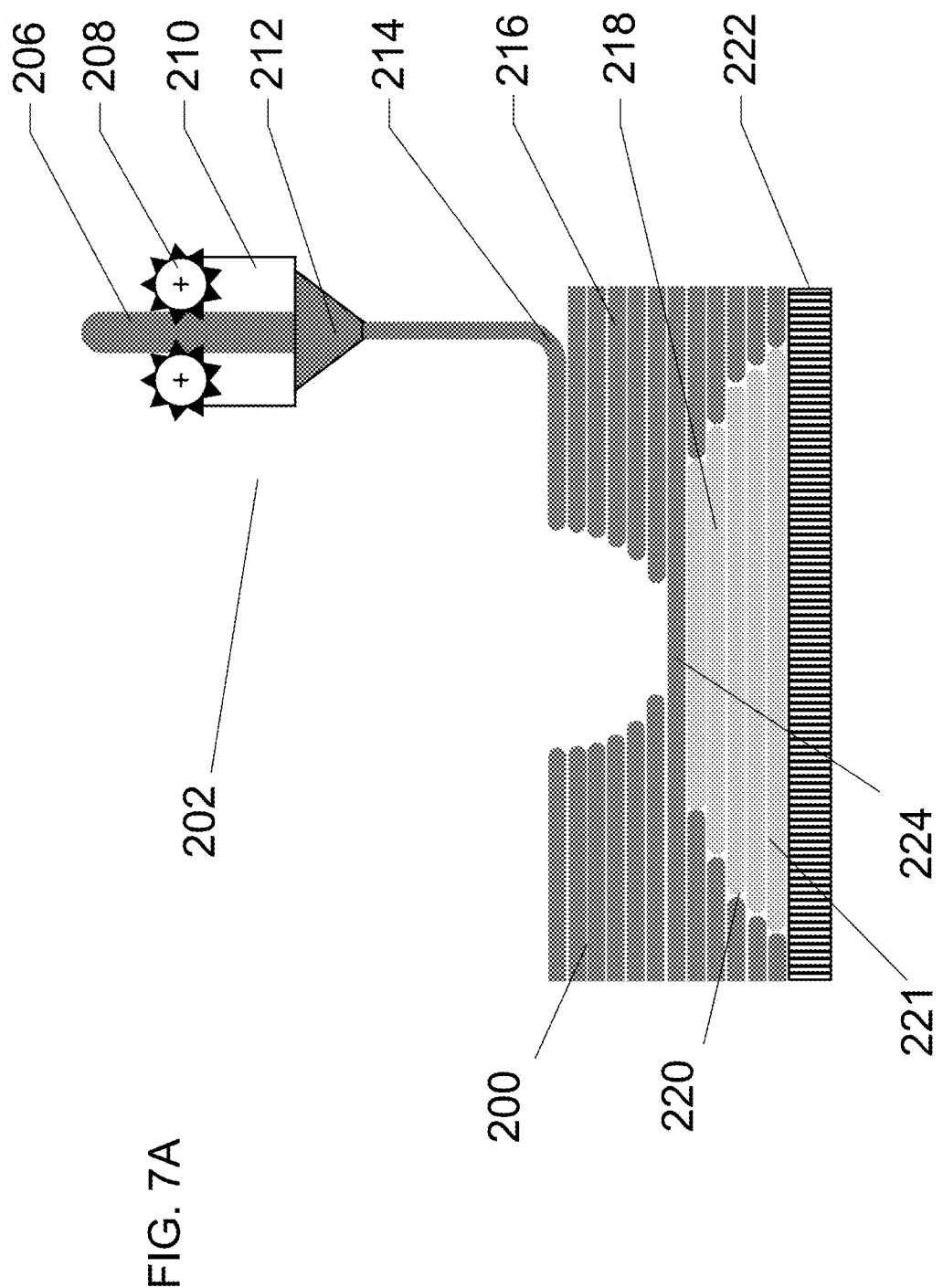
FIGS. 7A, 7B, and 7C are schematic views of a method of forming a hybrid heat exchanger using additive manufacturing.
Figure 7B:
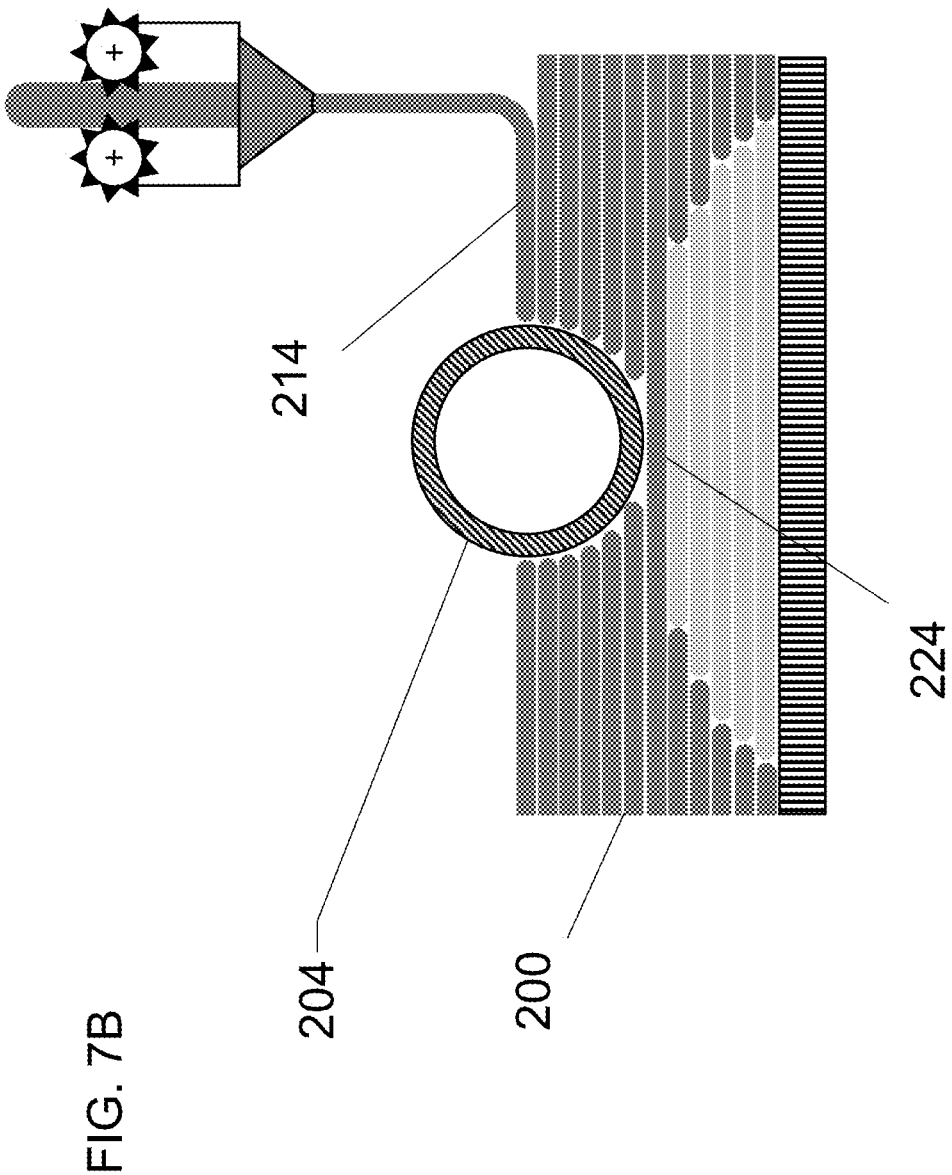
Figure 7C:
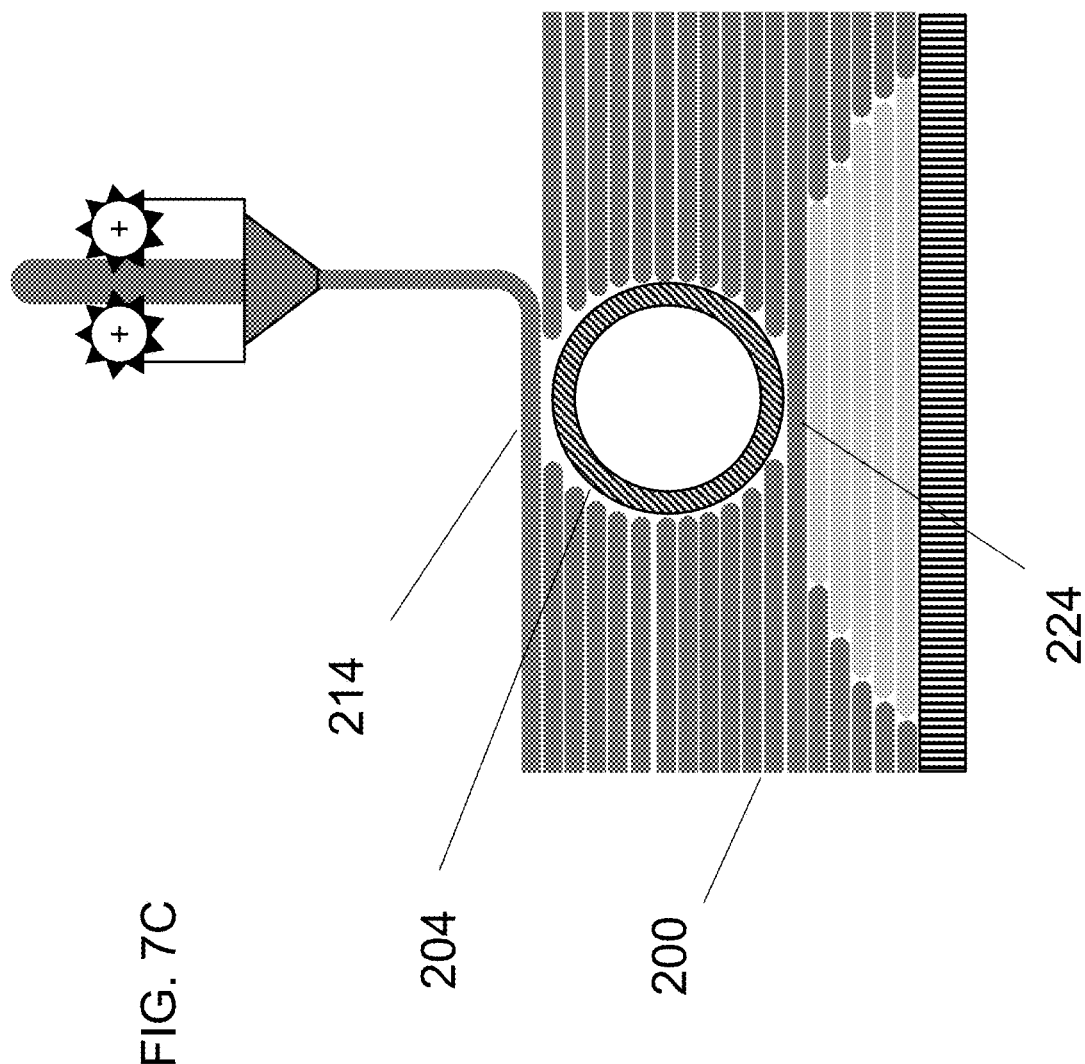

Regarding FIGS. 7A-7C, an example method to form a hybrid heat exchanger is provided. The method includes forming a body 200 of thermally conductive polymer using an additive manufacturing apparatus 202 and integrating the body 200 with a tube 204. The tube 204 may be, for example, a continuously formed metal tube or a tube made of another thermally conducting pressure handling material.

The apparatus 202 include a thermally conductive polymer filament 206, gears 208 to drive the filament 206 through a heated chamber 210 used to melt the filament and to the nozzle 212. The nozzle 212 deposits molten filament 214. After deposition, the molten filament 214 becomes solidified filament 216. In some embodiments, a removable support material such as a mold plate 218 is provided. The mold plate 218 may be removed, such as by being broken off or dissolved in a liquid. Removing the mold plate 218 leaves a corresponding shape in the solidified filament 216 such as bump 221 in FIG. 7A being removed to leave a recess 220 in the solidified filament 216. In some embodiments, a build plate 222 may be provided upon which the molten filament 214 is initially deposited. The solidified filament 216 may be removed from the mold plate 218 once the body 200 has been completed.

In one embodiment, the method of FIGS. 7A-7C includes the body 200 being formed using a fused deposition modeling (FDM) 3D printing process. Other additive manufacturing processes may be used, such as selective laser sintering, stereolithography (SLA) 3D printing and/or binder jetting.

Filament 206 is plasticized in the nozzle 212 and selectively deposited layer-by-layer to form the desired geometry of the body 200. Multiple nozzles 212 can be used to accelerate the process and/or print dissimilar materials (e.g. soluble sacrificial support material along with conductive polymer). The printed body 200 in FIG. 7A includes a collar portion, such as a channel 224, sized to have the tube 204 positioned therein.

The method includes positioning the tube 204 in the channel 224, as shown in FIG. 7B. The method includes continuing to deposit molten filament 214 to embed the tube 204 in the channel 224, as shown in FIG. 7C. The method of FIGS. 7A-7C may be aided with thermally conductive paste around the tube 204, bake-to-finish techniques, and/or mechanical fastening methods to secure all components into a completed and thermally effective assembly.

Figure 7E:
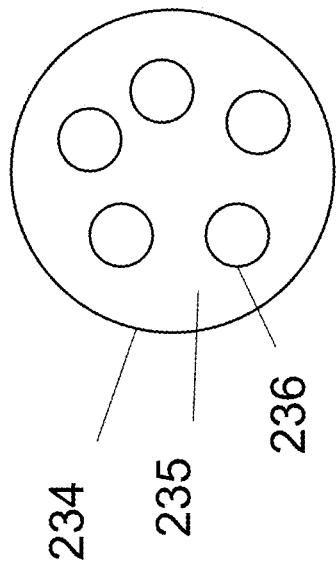
FIGS. 7D, 7E, and 7F are schematic views of thermally conductive polymer filaments that may be used with the method of FIGS. 7A-7C.
Figure 7F:
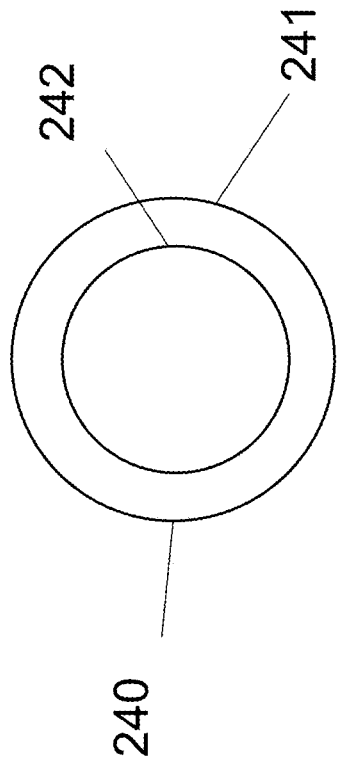
Figure 7D:
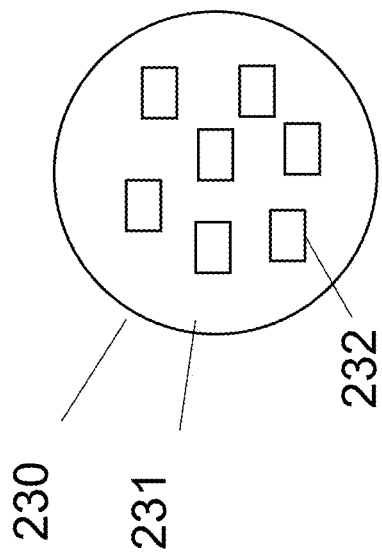

Regarding FIGS. 7D-7F, cross-sections are provided of various types of thermally conductive polymer filaments that may be used in accordance with methods described herein. Regarding FIG. 7D, a thermally conductive polymer filament 230 is provided having a matrix phase 231 of polymer material that may or may not be thermally conductive. The thermally conductive polymer filament 230 further includes a particulate phase 232 of a conductive material such as graphite or metal.

Regarding FIG. 7E, a thermally conductive polymer filament 234 is provided having a thermally conductive matrix 235 and continuous wires 236. The thermally conductive matrix 235 may be, for example, an elastomer such as a plastic material doped with a thermally conductive material such as graphite, aluminum, and/or copper.

The continuous wires 236 may be made of a metallic material such as copper and/or Nichrome which operate as a thermally conductive material. In an embodiment wherein the continuous wires 236 include Nichrome, a current may be applied to the Nichrome material to cause the continuous wires 236 to generate heat. With reference to FIG. 3, in one embodiment the cooling tower 24 may include a power source 99 operable to apply a current to nichrome wires of the body 12 for an active heating cycle. The active heating cycle could be used as a defrost, freeze prevention, or to force a phase transition in a phase change material of the body 12 as discussed below.

Regarding FIG. 7F, a thermally conductive polymer filament 240 is provided having a thermally conductive shell 241 made of, for example, TPU, ABS, or PLA plastics. The thermally conductive polymer filament 240 also has a phase change core 242 made of, for example, a paraffin, a non-paraffin organic, and/or a hydrated salt. The phase change core 242 has the ability to undergo, for example, a solid-liquid phase change after the thermally conductive polymer filament 240 has been deposited and hardened. The phase change of the phase change core 242 allows the thermally conductive polymer body printed using the thermally conductive polymer filament 240 to absorb heat via the phase change core 242 changing state. In this manner, the thermally conductive polymer body printed using the thermally conductive polymer filament 240 provides energy storage as well as energy transfer.

Figure 8A:
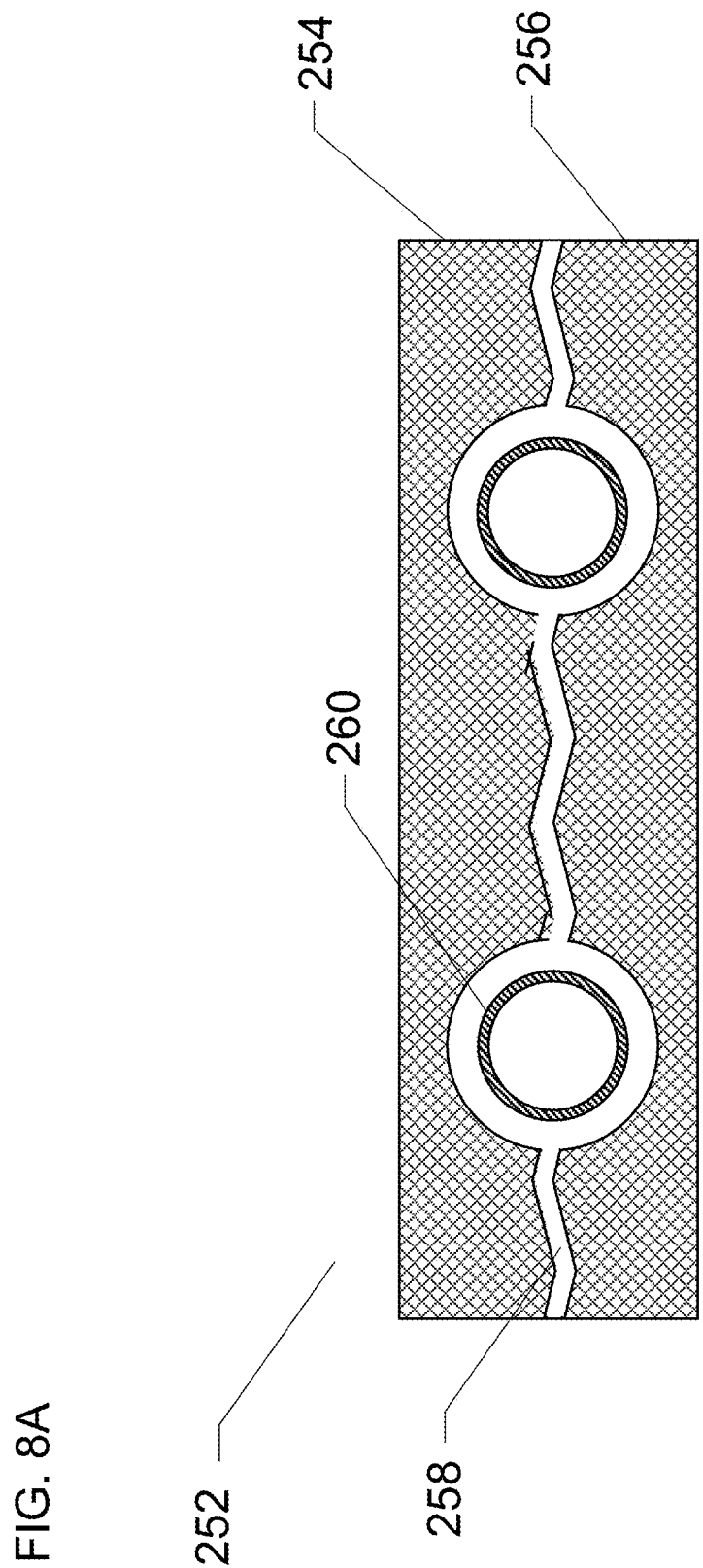
FIGS. 8A, 8B, and 8C are schematic views of a method of forming a hybrid heat exchanger using injection molding.
Figure 8B:
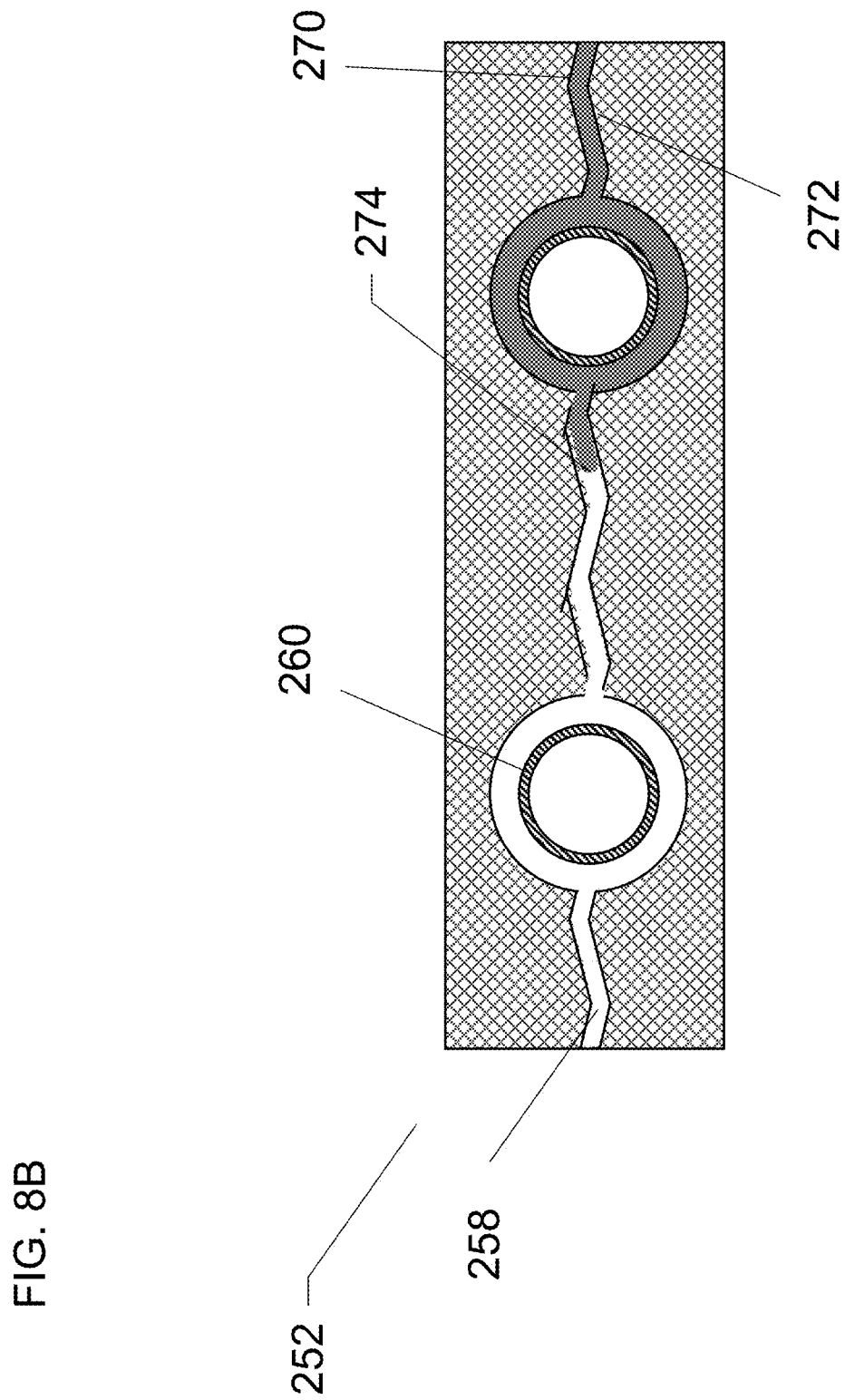
Figure 8C:
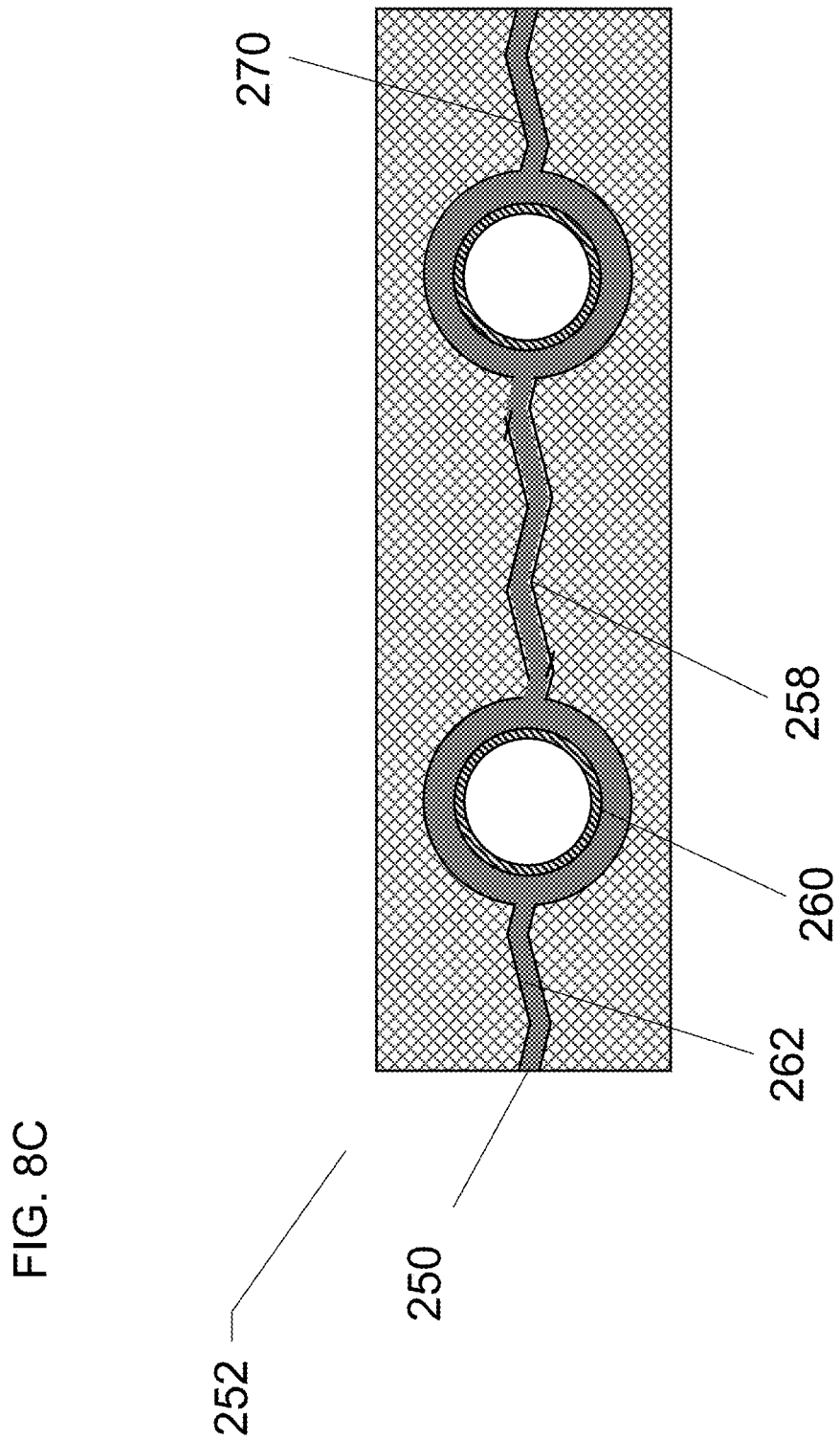

Regarding FIGS. 8A-8C, an example method is provided for forming a hybrid heat exchanger 250 (see FIG. 8C) using injection molding and a mold 252. The hybrid heat exchanger 250 includes a fluid conduit, such as tube 260, and a body 262 of thermally conductive polymer.

Regarding FIG. 8A, the mold 252 has a first mold portion such as upper pattern 254, a second mold portion such as lower pattern 256, and a cavity 258 therebetween. The method includes positioning a fluid conduit such as a tube 260 into the mold 252 and closing the mold 252 so that the tube 260 is in the cavity 258. The tube 260 is positioned in the cavity 258 so that there is adequate spacing between the tube 260 and the upper and lower patterns 254, 256 to form the desired thickness of the body 262. Injection molding the thermally conductive polymer onto the tube 260 allows the polymer to fuse to the tube 260, which fills in openings between the tube 260 and thermally conductive polymer to improve thermal contact between the tube 260 and body 262. Injection molding the thermally conductive polymer onto the tube 260 also provides structural rigidity for the hybrid heat exchanger 250.

Regarding FIG. 8B, the method includes injecting thermally conductive polymer 270 into the cavity 258 of the mold 252 and filling a portion 272 of the cavity 258. A melt front 274 of the polymer 270 advances throughout the cavity 258 until the cavity 258 is filled with the polymer 270, as shown in FIG. 8C.

FIG. 8C shows the hybrid heat exchanger 250 after the thermally conductive polymer 270 has been injected, and prior to removal or ejection of the hybrid heat exchanger 250 from the mold 252. In some approaches, aftermolding or bake-to-finish techniques may be utilizes applied after solidification of the polymer 270 to finalize the assembly and provide thermal contact and rigidity desired for a particular embodiment.

Figure 9:
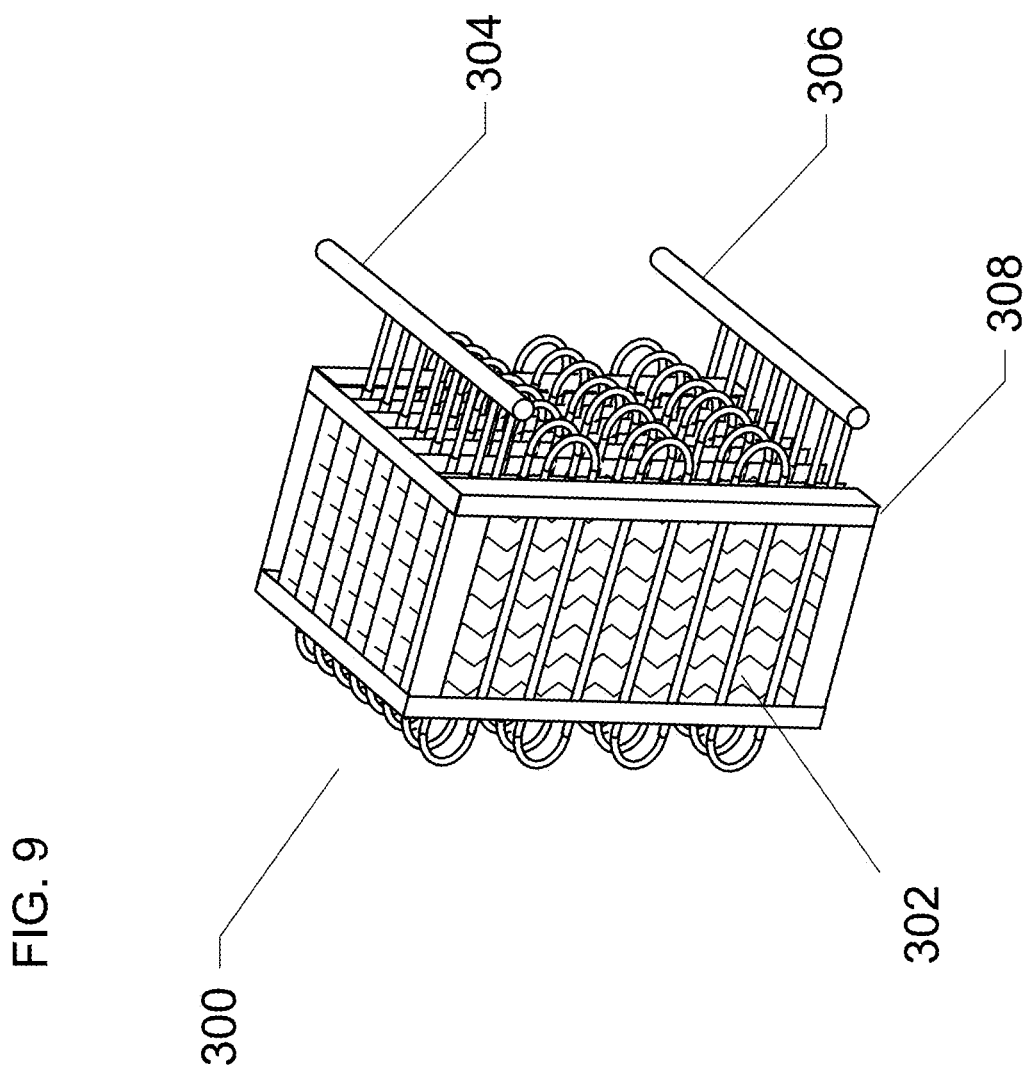
FIG. 9 is a perspective view of a hybrid heat exchanger assembly having a frame that maintains hybrid heat exchangers in fixed positions relative to one another.

Regarding FIG. 9, a hybrid heat exchanger assembly 300 is provided that is similar in many respects to the hybrid heat exchanger assembly 16 of FIG. 2. The hybrid heat exchanger assembly 300 includes multiple hybrid heat exchangers 302 connected in parallel to an inlet header 304 and an outlet header 306. The hybrid heat exchanger assembly 300 has a frame 308 that keeps the hybrid heat exchangers 302 fixed relative to one another.

Figure 10:
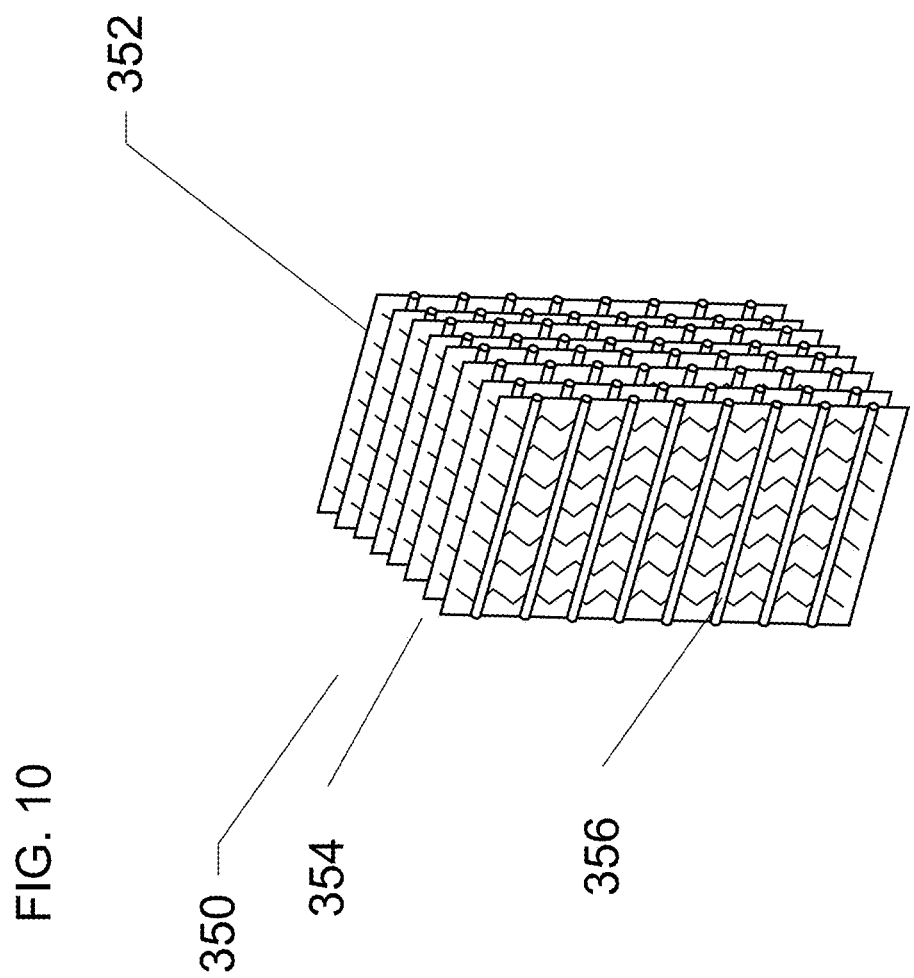
FIG. 10 is a perspective view of a single thermally conductive polymer body that may be integrated with multiple fluid conduits.

With reference to FIG. 10, a body 350 of thermally conductive polymer is shown. The body 350 has an array of sheets 352 that are formed as a single part using, for example, additive manufacturing. The body 350 has openings 354 to permit airflow through the body 350 and sheath portions 356 to receive fluid conduits, such as runs of serpentine tube that are connected via return bends outside of the body 350. In one embodiment, the sheets 350 are connected via struts of the body 350 extending between the sheets 350.

Figure 11:
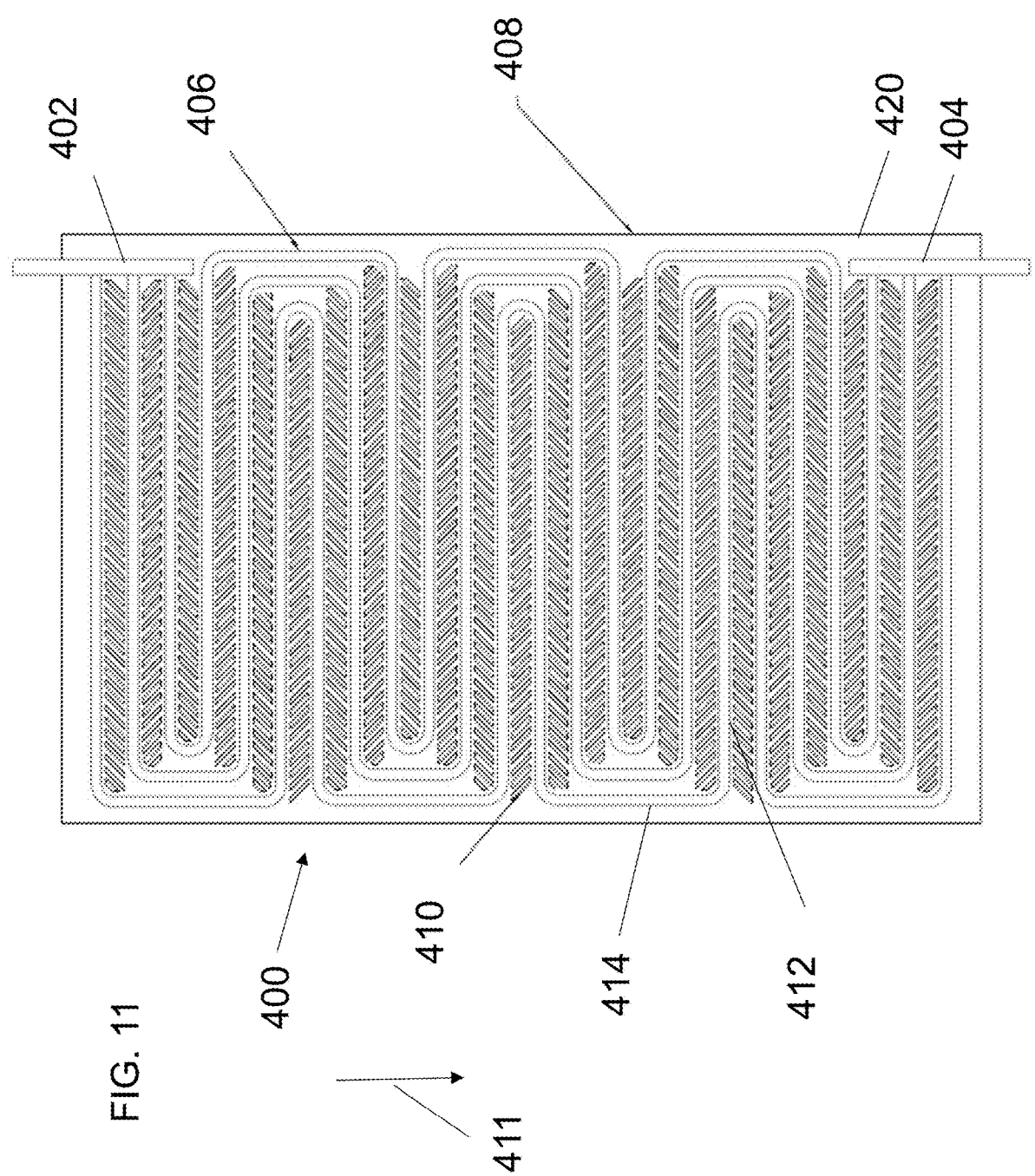
FIG. 11 is a schematic view of a hybrid heat exchanger having straight runs and return bends of tubes of the hybrid heat exchanger that are thermally integrated with a thermally conductive polymer body of the hybrid heat exchanger.

Regarding FIG. 11, a hybrid heat exchanger 400 is provided having an inlet tube 402, an outlet tube 404, and three tubes 406 connecting the inlet and outlet tubes 402, 404. The tubes 406 each include straight runs 412 and return bends 414 connecting the straight runs 412. The hybrid heat exchanger 400 has a body 408 of a thermally conductive polymer thermally integrated with the tubes 406. The body 408 is thermally integrated with the straight runs 412 as well as the return bends 414. The returns bends 414 are inward of an outer periphery 420 of the body 408. In one embodiment, the straight runs 412 and the return bends 414 are embedded in the body 408.

The thermally conductive polymer body 410 has surface enhancement features such as chevrons 410. In one embodiment, evaporative liquid is distributed in direction 411 onto the hybrid heat exchanger 400 and air travels across the hybrid heat exchanger 400 in a cross-flow or a counter-flow manner across the hybrid heat exchanger 400. The surface enhancement features 410 limit blow-by of air and create a tortuous path for evaporative liquid to travel across the hybrid heat exchanger 411 which improves heat transfer between the air and the evaporative liquid.

Regarding FIG. 12, a portion of a hybrid heat exchanger 450 is provided. The hybrid heat exchanger 450 has fluid conduits such as tubes 452 and a body 454 of thermally conductive polymer integrated with the tubes 452. The tubes 452 have centerlines 453 with a distance 455 therebetween.

The body 454 has chevrons 456 to affect fluid flow across an outer surface 458 of the body 454. The chevrons 456 are organized in alternating rows with the first row extending at a positive angle 460 relative to the vertical and the adjacent row extending at a negative angle 460 relative to the vertical. The angled orientation of the chevrons 456 causes a fluid traveling in direction 462 across the outer surface 458 of the body 454 to take a zig-zag path across the outer surface 458 which improves heat exchange between the fluid and the body 454.

Regarding FIG. 13, the chevrons 456 include ridges 472 and grooves 474 formed by wall portions 476 of the body 454. The ridges 472 have peaks 480 and the grooves 474 include valleys 482. The body 454 has a peak-to-valley height 484, a peak-to-valley distance 486, and a distance 488 between sheath portions 490 of the body 454 that may be selected for a particular embodiment. The sheath portions 490 extend around the entire cross-section of the tubes 452 and are bonded to a side wall 492 of the tubes 452. In other embodiments, the sheath portions 490 may extend about less than the entire cross-section of the tubes 452.

Figure 14:
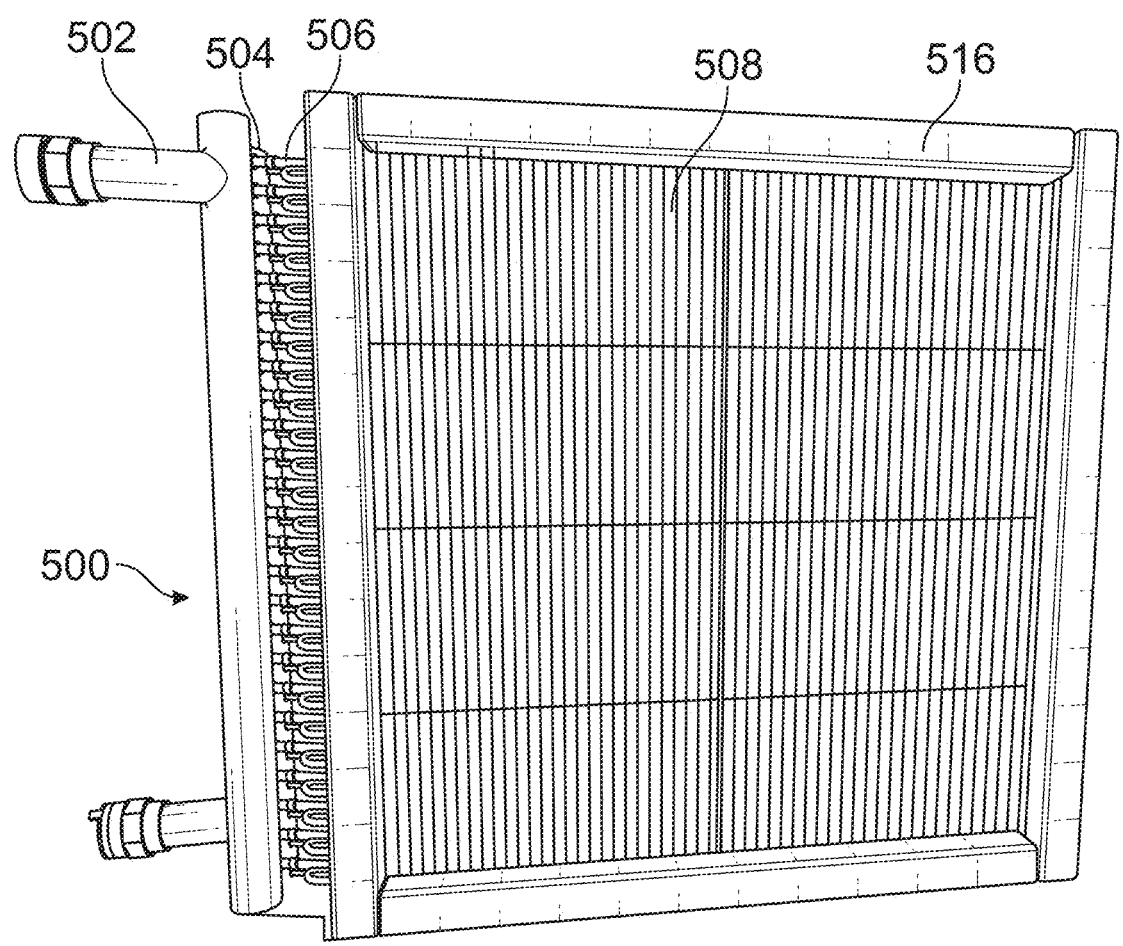
FIG. 14 is a perspective view of a hybrid heat exchanger having fluid conduits extending through a body of thermally conductive polymer.
Figure 15:
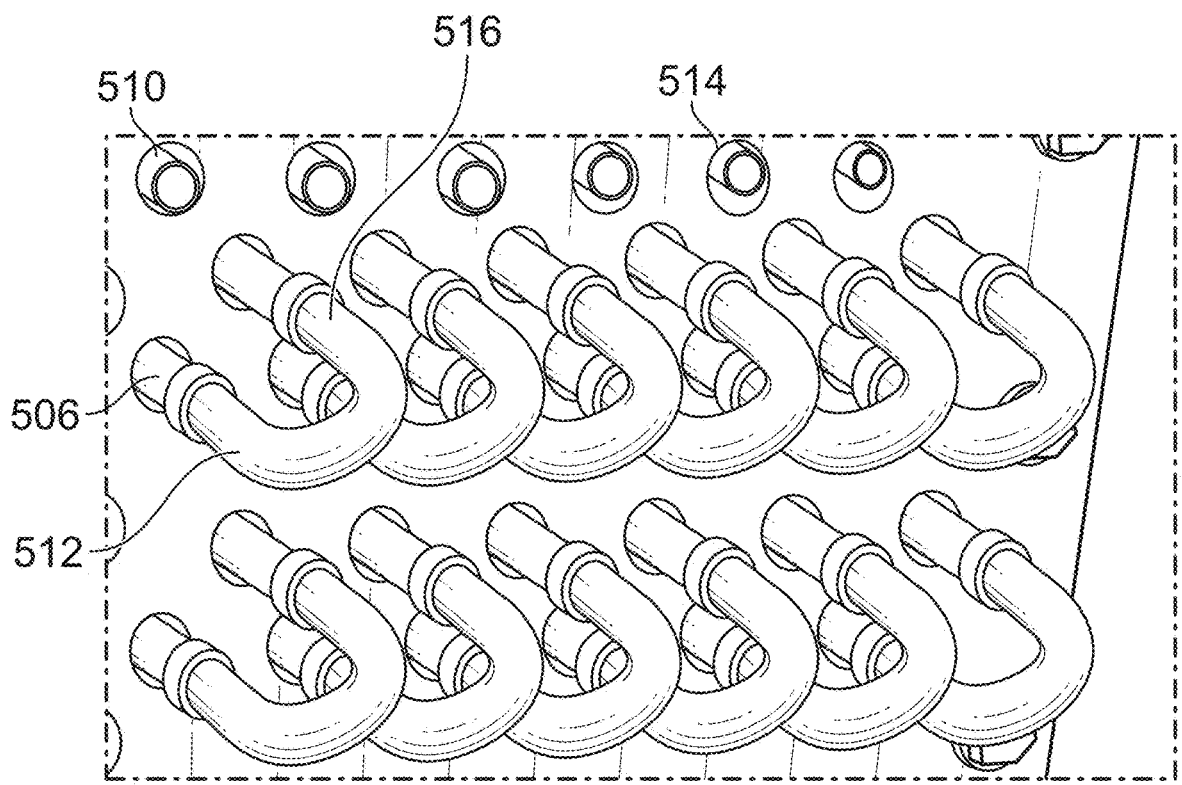
FIG. 15 is a perspective view of a portion of the hybrid heat exchanger of FIG. 14 showing straight runs and return bends of tubes of the hybrid heat exchanger.

Regarding FIG. 14, a hybrid heat exchanger 500 is provided that includes an inlet tube 502, an outlet tube 504, circuit tubes 506, and a body 508 of thermally conductive polymer. In FIG. 15, the inlet tube 502 and outlet tube 504 are removed to show the circuit tubes 506 include straight runs 510 and return bends 512. The tubes 506 extend through openings 514 in a housing 516 for the body 508. The tubes 506 may be copper tubes, for example.

Figure 16:
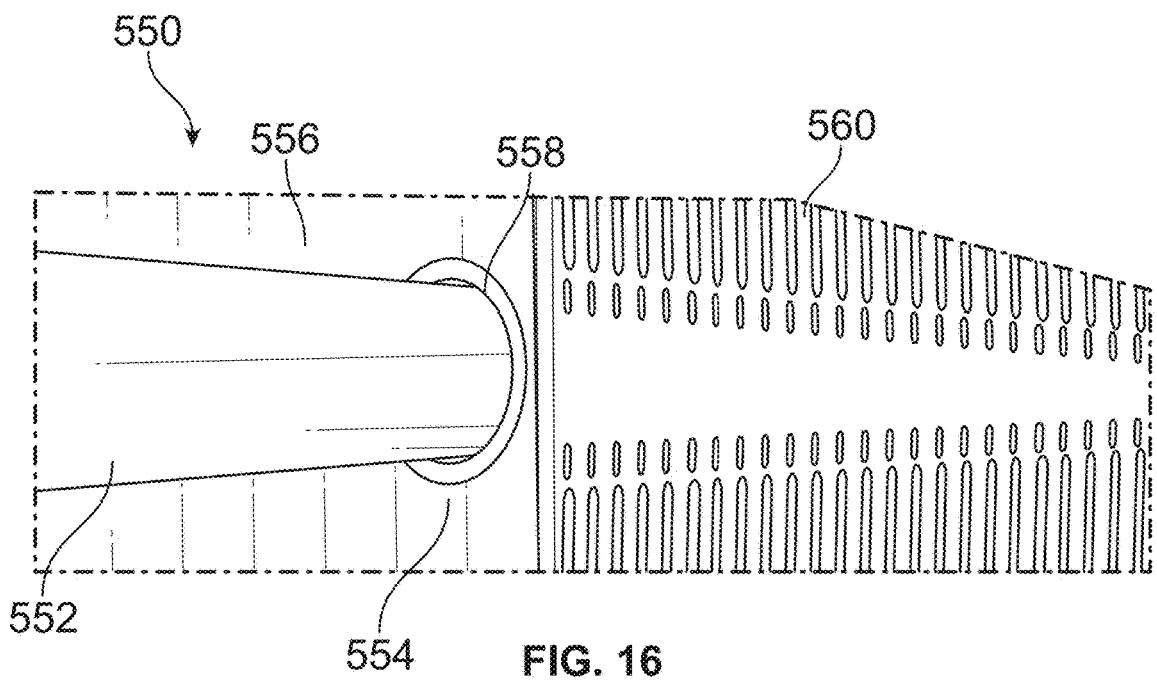
FIG. 16 is a perspective view of a hybrid heat exchanger having a tube extending into a body of a thermally conductive polymer, FIG. 16 showing fins of the thermally conductive polymer body.

Regarding FIG. 16, a hybrid heat exchanger 550 is provided that includes a fluid conduit, such as copper tube 552, and a body 554 of a thermally conductive polymer thermally integrated with the copper tube 552. The body 554 has a collar portion 556 extending about an opening 558 of the body 554 and fins 560. The body 554 is 3D printed using a thermally conductive polymer filament. The copper tube 552 was advanced into the opening 558 after printing of the body 554 to assemble the hybrid heat exchanger 550. The outer diameter of the copper tube 552 was larger than an inner diameter of the opening 558 after 3D printing the body 554. The advancing of the copper tube 552 into the opening 558 deformed the collar portion 556 of the body 554 around the opening 558 and created an interference fit that secured the body 554 to the copper tube 552. In another approach, the copper tube 552 has an outer diameter smaller than the inner diameter of the opening 558 of the body 554, the copper tube 552 is advanced into the opening 558, and the copper tube 552 is expanded into engagement with the body 554 such as by applying a fluid (e.g., water) at high pressure to the interior of the copper tube 552.

Various different materials could be used in the additive manufacturing process to form the hybrid heat exchangers described herein, and there is significant possible variation in capability/functionality of the thermally conductive polymer materials. For example, adding continuous copper wire may increase thermal conductivity and/or adding continuous Nichrome wire may provide the hybrid heat exchanger with heating properties. Embedding phase change materials in the additive manufacturing filament may also allow for various thermal energy storage designs to be utilized in accordance with these disclosures.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A heat exchanger system comprising:
   an inlet header to receive a process fluid;
   an outlet header;
   a plurality of fluid conduits of a first thermally conductive material, the fluid conduits each having an inlet end portion connected to the inlet header, an outlet end portion connected to the outlet header, and an intermediate portion between the inlet and outlet end portions along the fluid conduits, the fluid conduits configured to permit process fluid to flow from the inlet header to the outlet header;
   wherein the intermediate portion of each of the fluid conduits includes a series of runs and return bends, each run having a length between two of the bends of the fluid conduit
   at least one body of a thermally conductive polymer different than the first thermally conductive material and having an outer surface; and
   the at least one thermally conductive polymer body in thermal contact with the at least one of the runs of each of the fluid conduits for a majority of the length of the at least one of the runs, the at least one thermally conductive polymer body configured to facilitate heat transfer between the process fluid as the process fluid travels through the intermediate portions of the fluid conduits and a fluid at the outer surface of the at least one thermally conductive polymer body.

2. The heat exchanger system of claim 1 wherein the at least one thermally conductive polymer body is secured to the intermediate portions of the fluid conduit and is spaced from the inlet and outlet header.

3. The heat exchanger system of claim 1 wherein the fluid conduits each have a length; and
   at least one of the fluid conduits is embedded in the at least one thermally conductive polymer body for at least a portion of the length of the at least one fluid conduit.

4. The heat exchanger system of claim 1 wherein the fluid conduits each have a length; and
   wherein the at least one thermally conductive polymer body is in thermal contact with the fluid conduits for at least a majority of the lengths of the fluid conduits.

5. The heat exchanger system of claim 1 wherein the runs of the fluid conduits each have an outer surface and a cross-section normal to the length thereof; and
   wherein the at least one thermally conductive polymer body is in thermal contact with the outer surface of the at least one run of each of the fluid conduits about at least a majority of the cross-section of the at least one run.

6. The heat exchanger system of claim 1 further comprising:
a fan operable to generate airflow relative to the at least one thermally conductive polymer body;
an evaporative liquid distribution system configured to distribute the fluid onto the outer surface of the at least one thermally conductive polymer body; and
a sump to collect the fluid from the outer surface of the at least one thermally conductive polymer body.

7. The heat exchanger system of claim 1 wherein the at least one thermally conductive polymer body comprises a polymer material and at least one of:
graphite particles;
metallic particles;
a metallic wire; and
a phase change material.

8. The heat exchanger system of claim 1 wherein the fluid conduit comprises at least one of:
a stainless steel tube;
an aluminum tube;
a copper tube; and
a carbon steel tube.

9. The heat exchanger system of claim 1 wherein the fluid conduits are micro channels.

10. The heat exchanger system of claim 1 wherein the at least one body comprises a plurality of bodies.

11. The heat exchanger system of claim 1 wherein the at least one body comprises a plurality of sheets of the thermally conductive polymer.

12. The heat exchanger system of claim 1 wherein the intermediate portions of the fluid conduits include runs and bends connecting the runs; and
wherein the at least one thermally conductive polymer body comprises:
a sheet; and
covers connected to the sheet and extending about the runs.

13. The heat exchanger system of claim 1 wherein the at least one thermally conductive polymer body comprises a polymer material and a phase change material.

14. The heat exchanger system of claim 13 wherein the at least one thermally conductive polymer body includes at least one thermally conductive wire.

15. The heat exchanger system of claim 1 wherein the at least one thermally conductive polymer body comprises a matrix phase of a polymer material and a particulate phase of a different material having a higher thermal conductivity than the polymer material.

16. The heat exchanger system of claim 1 wherein the runs of the fluid conduits each have an outer surface and a cross-section normal to the length of the run;
wherein the at least one thermally conductive polymer body is in thermal contact with the outer surface of the at least one run of each of the fluid conduits about the entire cross-section of the at least one run for at least a majority of the length of the at least one run.

17. A heat exchanger system comprising:
an inlet header to receive a process fluid;
an outlet header;
a plurality of fluid conduits of a first thermally conductive material, the fluid conduits each having an inlet end portion connected to the inlet header, an outlet end portion connected to the outlet header, and an intermediate portion between the inlet and outlet end portions along the fluid conduits, the fluid conduits configured to permit process fluid to flow from the inlet header to the outlet header;
at least one body of a thermally conductive polymer different than the first thermally conductive material and having an outer surface;
the at least one thermally conductive polymer body in thermal contact with the intermediate portions of the fluid conduits and configured to facilitate heat transfer between the process fluid as the process fluid travels through the intermediate portions of the fluid conduits and a fluid at the outer surface of the at least one thermally conductive polymer body; and
a thermally conductive paste thermally connecting the at least one thermally conductive polymer body and the fluid conduits.

18. The heat exchanger system of claim 17 wherein the at least one thermally conductive polymer body is secured to the intermediate portions of the fluid conduit and is spaced from the inlet and outlet header.

19. The heat exchanger system of claim 17 wherein the fluid conduits each have a length; and
at least one of the fluid conduits is embedded in the at least one thermally conductive polymer body for at least a portion of the length of the at least one fluid conduit.

20. The heat exchanger system of claim 17 wherein the fluid conduits each have a length; and
wherein the at least one thermally conductive polymer body is in thermal contact with the fluid conduits for at least a majority of the lengths of the fluid conduits.

21. The heat exchanger system of claim 17 wherein the intermediate portion of each of the fluid conduits includes a series of runs and return bends;
wherein the runs of the fluid conduits each have an outer surface, a length, and a cross-section normal to the length; and
wherein the at least one thermally conductive polymer body is in thermal contact with the outer surface of at least one run of each of the fluid conduits about at least a majority of the cross-section of the at least one run.

22. The heat exchanger system of claim 17 wherein the at least one thermally conductive polymer body has a thermal conductivity of at least two Watts per meter-Kelvin.

23. The heat exchanger system of claim 17 further comprising:
a fan operable to generate airflow relative to the at least one thermally conductive polymer body;
an evaporative liquid distribution system configured to distribute the fluid onto the outer surface of the at least one thermally conductive polymer body; and
a sump to collect the fluid from the outer surface of the at least one thermally conductive polymer body.

24. The heat exchanger system of claim 17 wherein the at least one thermally conductive polymer body comprises a polymer material and at least one of:
graphite particles;
metallic particles;
a metallic wire; and
a phase change material.

25. The heat exchanger system of claim 17 wherein the fluid conduit comprises at least one of:
a stainless steel tube;
an aluminum tube;
a copper tube; and
a carbon steel tube.

26. The heat exchanger system of claim 17 wherein the fluid conduits are micro channels.

27. The heat exchanger system of claim 17 wherein the at least one body comprises a plurality of bodies.

28. The heat exchanger system of claim 17 wherein the at least one body comprises a plurality of sheets of the thermally conductive polymer.

29. The heat exchanger system of claim 17 wherein the intermediate portions of the fluid conduits include runs and bends connecting the runs; and
wherein the at least one thermally conductive polymer body comprises:
a sheet; and
covers connected to the sheet and extending about the runs.

30. The heat exchanger system of claim 17 wherein the intermediate portion of each of the fluid conduits includes a series of runs and return bends;
wherein the runs of the fluid conduits each have an outer surface, a length, and a cross-section normal to the length; and
wherein the at least one thermally conductive polymer body is in thermal contact with the outer surface of at least one run of each of the fluid conduits about the entire cross-section of the at least one run for at least a majority of the length of the at least one run.

31. A heat exchanger system comprising:
an inlet header to receive a process fluid;
an outlet header;
a plurality of fluid conduits of a first thermally conductive material, the fluid conduits each having an inlet end portion connected to the inlet header, an outlet end portion connected to the outlet header, and an intermediate portion between the inlet and outlet end portions along the fluid conduits, the fluid conduits configured to permit process fluid to flow from the inlet header to the outlet header;
at least one body of a thermally conductive polymer different than the first thermally conductive material and having an outer surface;
the at least one thermally conductive polymer body in thermal contact with the intermediate portions of the fluid conduits and configured to facilitate heat transfer between the process fluid as the process fluid travels through the intermediate portions of the fluid conduits and a fluid at the outer surface of the at least one thermally conductive polymer body; and
wherein the at least one thermally conductive polymer body has a thermal conductivity of at least two Watts per meter-Kelvin.

32. The heat exchanger system of claim 31 wherein the at least one thermally conductive polymer body is secured to the intermediate portions of the fluid conduit and is spaced from the inlet and outlet header.

33. The heat exchanger system of claim 31 wherein the fluid conduits each have a length; and
at least one of the fluid conduits is embedded in the at least one thermally conductive polymer body for at least a portion of the length of the at least one fluid conduit.

34. The heat exchanger system of claim 31 wherein the fluid conduits each have a length; and
wherein the at least one thermally conductive polymer body is in thermal contact with the fluid conduits for at least a majority of the lengths of the fluid conduits.

35. The heat exchanger system of claim 31 wherein the intermediate portion of each of the fluid conduits includes a series of runs and return bends;
wherein the runs of the fluid conduits each have an outer surface, a length, and a cross-section normal to the length; and
wherein the at least one thermally conductive polymer body is in thermal contact with the outer surface of at least one run of each of the fluid conduits about at least a majority of the cross-section of the at least one run.

36. The heat exchanger system of claim 31 further comprising:
a fan operable to generate airflow relative to the at least one thermally conductive polymer body;
an evaporative liquid distribution system configured to distribute the fluid onto the outer surface of the at least one thermally conductive polymer body; and
a sump to collect the fluid from the outer surface of the at least one thermally conductive polymer body.

37. The heat exchanger system of claim 31 wherein the at least one thermally conductive polymer body comprises a polymer material and at least one of:
graphite particles;
metallic particles;
a metallic wire; and
a phase change material.

38. The heat exchanger system of claim 31 wherein the fluid conduit comprises at least one of:
a stainless steel tube;
an aluminum tube;
a copper tube; and
a carbon steel tube.

39. The heat exchanger system of claim 31 wherein the fluid conduits are micro channels.

40. The heat exchanger system of claim 31 wherein the at least one body comprises a plurality of bodies.

41. The heat exchanger system of claim 31 wherein the at least one body comprises a plurality of sheets of the thermally conductive polymer.

42. The heat exchanger system of claim 31 wherein the intermediate portions of the fluid conduits include runs and bends connecting the runs; and
wherein the at least one thermally conductive polymer body comprises:
a sheet; and
covers connected to the sheet and extending about the runs.

43. The heat exchanger system of claim 31 wherein the intermediate portion of each of the fluid conduits includes a series of runs and return bends;
wherein the runs of the fluid conduits each have an outer surface, a length, and a cross-section normal to the length; and
wherein the at least one thermally conductive polymer body is in thermal contact with the outer surface of at least one run of each of the fluid conduits about the entire cross-section of the at least one run for at least a majority of the length of the at least one run.

* * * * *